US010614725B2

(12) United States Patent
Boguraev et al.

(10) Patent No.: US 10,614,725 B2
(45) Date of Patent: *Apr. 7, 2020

(54) GENERATING SECONDARY QUESTIONS IN AN INTROSPECTIVE QUESTION ANSWERING SYSTEM

(75) Inventors: Branimir K. Boguraev, Bedford, NY (US); David W. Buchanan, Ossining, NY (US); Jennifer Chu-Carroll, Dobbs Ferry, NY (US); David A. Ferrucci, Yorktown Heights, NY (US); Aditya A. Kalyanpur, Westwood, NJ (US); James W. Murdock, IV, Millwood, NY (US); Siddharth A. Patwardhan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1107 days.

This patent is subject to a terminal disclaimer.

(21) Appl. No.: 13/610,355

(22) Filed: Sep. 11, 2012

(65) Prior Publication Data
US 2014/0072948 A1 Mar. 13, 2014

Related U.S. Application Data

(63) Continuation of application No. 13/610,267, filed on Sep. 11, 2012.

(51) Int. Cl.
*G09B 7/00* (2006.01)
(52) U.S. Cl.
CPC ...................................... *G09B 7/00* (2013.01)
(58) Field of Classification Search
CPC .......... G06N 99/005; G06N 5/04; G06N 5/02; G06Q 10/06; G06Q 10/10; G09B 7/00
(Continued)

(56) References Cited

U.S. PATENT DOCUMENTS

| 3,559,995 A | 2/1971 | Steadman |
| 4,594,686 A | 6/1986 | Yoshida |

(Continued)

FOREIGN PATENT DOCUMENTS

| CN | 101308486 A | 3/2008 |
| EP | 0513638 | 11/1992 |

(Continued)

OTHER PUBLICATIONS

IBM Research Report Watson: Beyond Jeopardy! David Ferrucci, Anthony Levas, Sugato Bagchi, David Gondek, Erik Mueller IBM Research Division Thomas J. Watson Research Center P.O. Box 704 Yorktown Heights, NY 10598 RC25270 (WII06-019) Jun. 2, 2011.*

(Continued)

*Primary Examiner* — Kakali Chaki
*Assistant Examiner* — Ababacar Seck
(74) *Attorney, Agent, or Firm* — Ewa M. Wozniak

(57) ABSTRACT

A method of generating secondary questions in a question-answer system. Missing information is identified from a corpus of data using a computerized device. The missing information comprises any information that improves confidence scores for candidate answers to a question. The computerized device automatically generates a plurality of hypotheses concerning the missing information. The computerized device automatically generates at least one secondary question based on each of the plurality of hypotheses. The hypotheses are ranked based on relative utility to determine an order in which the computerized device outputs the at least one secondary question to external sources to obtain responses.

21 Claims, 13 Drawing Sheets

(58) Field of Classification Search
USPC .......................................................... 706/45
See application file for complete search history.

(56) References Cited

U.S. PATENT DOCUMENTS

| | | | |
|---|---|---|---|
| 4,599,691 A | 7/1986 | Sakaki et al. | |
| 4,829,423 A | 5/1989 | Tennant et al. | |
| 4,921,427 A | 5/1990 | Dunn | |
| 5,384,894 A | 1/1995 | Vassiliadis et al. | |
| 5,414,797 A | 5/1995 | Vassiliadis et al. | |
| 5,513,116 A | 4/1996 | Buckley et al. | |
| 5,519,608 A * | 5/1996 | Kupiec | G06F 17/3064 704/9 |
| 5,546,316 A | 8/1996 | Buckley et al. | |
| 5,550,746 A | 8/1996 | Jacobs | |
| 5,559,714 A | 9/1996 | Banks et al. | |
| 5,677,993 A | 10/1997 | Ohga et al. | |
| 5,719,619 A | 2/1998 | Hattori et al. | |
| 5,724,571 A | 3/1998 | Woods | |
| 5,726,898 A | 3/1998 | Jacobs | |
| 5,768,142 A | 6/1998 | Jacobs | |
| 5,873,056 A | 2/1999 | Liddy et al. | |
| 5,875,110 A | 2/1999 | Jacobs | |
| 6,275,788 B1 | 8/2001 | Watanabe et al. | |
| 6,315,572 B1 | 11/2001 | Owens et al. | |
| 6,336,029 B1 | 1/2002 | Ho et al. | |
| 6,480,698 B2 | 11/2002 | Ho et al. | |
| 6,487,545 B1 | 11/2002 | Wical | |
| 6,498,921 B1 | 12/2002 | Ho et al. | |
| 6,501,937 B1 | 12/2002 | Ho et al. | |
| 6,571,240 B1 | 5/2003 | Ho et al. | |
| 6,584,464 B1 | 6/2003 | Warthen | |
| 6,584,470 B2 | 6/2003 | Veale | |
| 6,592,176 B2 | 7/2003 | Lumpe et al. | |
| 6,594,654 B1 | 7/2003 | Salam et al. | |
| 6,631,377 B2 | 10/2003 | Kuzumaki | |
| 6,665,666 B1 | 12/2003 | Brown et al. | |
| 6,701,322 B1 | 3/2004 | Green | |
| 6,732,090 B2 | 5/2004 | Shanahan et al. | |
| 6,754,647 B1 | 6/2004 | Tackett et al. | |
| 6,778,979 B2 | 8/2004 | Grefenstette et al. | |
| 6,816,858 B1 | 11/2004 | Coden et al. | |
| 6,820,075 B2 | 11/2004 | Shanahan et al. | |
| 6,829,603 B1 | 12/2004 | Chai et al. | |
| 6,829,605 B2 | 12/2004 | Azzam | |
| 6,859,800 B1 | 2/2005 | Roche et al. | |
| 6,863,606 B1 | 3/2005 | Berg et al. | |
| 6,865,370 B2 | 3/2005 | Ho et al. | |
| 6,928,425 B2 | 8/2005 | Grefenstette et al. | |
| 6,928,432 B2 | 8/2005 | Fagan et al. | |
| 6,947,885 B2 | 9/2005 | Bangalore et al. | |
| 6,957,213 B1 | 10/2005 | Yuret | |
| 6,983,252 B2 | 1/2006 | Matheson et al. | |
| 6,993,517 B2 | 1/2006 | Naito et al. | |
| 7,007,104 B1 | 2/2006 | Lewis et al. | |
| 7,031,951 B2 | 4/2006 | Mancisidor et al. | |
| 7,051,014 B2 | 5/2006 | Brill et al. | |
| 7,054,803 B2 | 5/2006 | Eisele | |
| 7,058,564 B2 | 6/2006 | Ejerhed | |
| 7,117,432 B1 | 10/2006 | Shanahan et al. | |
| 7,120,574 B2 | 10/2006 | Troyanova et al. | |
| 7,133,862 B2 | 11/2006 | Hubert et al. | |
| 7,136,909 B2 | 11/2006 | Balasuriya | |
| 7,139,752 B2 | 11/2006 | Broder et al. | |
| 7,149,732 B2 | 12/2006 | Wen et al. | |
| 7,152,057 B2 | 12/2006 | Brill et al. | |
| 7,171,351 B2 | 1/2007 | Zhou | |
| 7,177,798 B2 | 2/2007 | Hsu et al. | |
| 7,194,455 B2 | 3/2007 | Zhou et al. | |
| 7,197,460 B1 | 3/2007 | Gupta et al. | |
| 7,197,739 B2 | 3/2007 | Preston et al. | |
| 7,206,780 B2 | 4/2007 | Slackman | |
| 7,209,923 B1 | 4/2007 | Cooper | |
| 7,216,073 B2 | 5/2007 | Lavi et al. | |
| 7,236,968 B2 | 6/2007 | Seki et al. | |
| 7,246,087 B1 | 7/2007 | Ruppelt et al. | |
| 7,249,127 B2 | 7/2007 | Azzam | |
| 7,266,537 B2 | 9/2007 | Jacobsen et al. | |
| 7,269,545 B2 | 9/2007 | Agichtein et al. | |
| 7,293,015 B2 | 11/2007 | Zhou | |
| 7,299,228 B2 | 11/2007 | Cao et al. | |
| 7,313,515 B2 | 12/2007 | Crouch et al. | |
| 7,337,158 B2 | 2/2008 | Fratkina et al. | |
| 7,349,840 B2 | 3/2008 | Budzinski | |
| 7,512,978 B1 | 3/2009 | Screen et al. | |
| 7,519,529 B1 | 4/2009 | Horvitz | |
| 7,677,967 B2 | 3/2010 | Jessop et al. | |
| 7,680,891 B1 | 3/2010 | Pongsajapan | |
| 7,809,664 B2 | 10/2010 | Heck | |
| 7,841,940 B2 | 11/2010 | Bronstein | |
| 7,856,350 B2 | 12/2010 | Zhou et al. | |
| 7,953,720 B1 | 5/2011 | Rohde et al. | |
| 7,974,964 B2 | 7/2011 | Cucerzan et al. | |
| 8,275,803 B2 | 9/2012 | Brown et al. | |
| 8,332,394 B2 | 12/2012 | Fan et al. | |
| 8,380,503 B2 | 2/2013 | Gross | |
| 8,412,514 B1 | 4/2013 | Feng et al. | |
| 8,560,567 B2 | 10/2013 | Azzam et al. | |
| 8,756,212 B2 | 6/2014 | Chipalkatti et al. | |
| 8,768,925 B2 | 7/2014 | Brown et al. | |
| 8,983,977 B2 | 3/2015 | Ishikawa | |
| 9,047,567 B2 | 6/2015 | Barborak et al. | |
| 9,053,425 B2 | 6/2015 | Barborak et al. | |
| 9,146,917 B2 | 9/2015 | Barborak et al. | |
| 9,165,252 B2 | 10/2015 | Barborak et al. | |
| 9,703,861 B2 | 7/2017 | Brown et al. | |
| 2001/0032211 A1 | 10/2001 | Kuzumaki | |
| 2001/0034258 A1 | 10/2001 | Darden et al. | |
| 2001/0034727 A1 | 10/2001 | Ciurcina | |
| 2001/0053968 A1 | 12/2001 | Galitsky et al. | |
| 2001/0054019 A1 | 12/2001 | de Fabrega | |
| 2002/0026435 A1 | 2/2002 | Wyss | |
| 2002/0188586 A1 | 12/2002 | Veale | |
| 2003/0009448 A1 | 1/2003 | Covington, Jr. et al. | |
| 2003/0033287 A1 | 2/2003 | Shanahan et al. | |
| 2003/0040923 A1 | 2/2003 | Dietz et al. | |
| 2003/0050907 A1 | 3/2003 | Wolters, Jr. et al. | |
| 2003/0220890 A1 | 11/2003 | Okude | |
| 2004/0023191 A1 | 2/2004 | Brown et al. | |
| 2004/0049499 A1 | 3/2004 | Nomoto et al. | |
| 2004/0064305 A1 | 4/2004 | Sakai | |
| 2004/0122660 A1 | 6/2004 | Cheng et al. | |
| 2004/0243645 A1 | 12/2004 | Broder et al. | |
| 2004/0254917 A1 | 12/2004 | Brill et al. | |
| 2005/0033711 A1 | 2/2005 | Horvitz et al. | |
| 2005/0050037 A1 | 3/2005 | Frieder et al. | |
| 2005/0060301 A1 | 3/2005 | Seki et al. | |
| 2005/0086045 A1 | 4/2005 | Murata | |
| 2005/0086222 A1 | 4/2005 | Wang et al. | |
| 2005/0108103 A1 | 5/2005 | Roberts et al. | |
| 2005/0114327 A1 | 5/2005 | Kumamoto et al. | |
| 2005/0137723 A1 | 6/2005 | Liu et al. | |
| 2005/0143999 A1 | 6/2005 | Ichimura | |
| 2005/0197870 A1 | 9/2005 | Canada et al. | |
| 2005/0256700 A1 | 11/2005 | Moldovan et al. | |
| 2006/0053000 A1 | 3/2006 | Moldovan et al. | |
| 2006/0106788 A1 | 5/2006 | Forrest | |
| 2006/0122834 A1 | 6/2006 | Bennett | |
| 2006/0122876 A1 | 6/2006 | Von Schweber et al. | |
| 2006/0141438 A1 | 6/2006 | Chang et al. | |
| 2006/0173834 A1 | 8/2006 | Brill et al. | |
| 2006/0204945 A1 | 9/2006 | Masuichi et al. | |
| 2006/0206472 A1 | 9/2006 | Masuichi et al. | |
| 2006/0206481 A1 | 9/2006 | Ohkuma et al. | |
| 2006/0235689 A1 | 10/2006 | Sugihara et al. | |
| 2006/0277165 A1 | 12/2006 | Yoshimura et al. | |
| 2006/0282414 A1 | 12/2006 | Sugihara et al. | |
| 2006/0286530 A1 | 12/2006 | Forrest et al. | |
| 2006/0294037 A1 | 12/2006 | Horvitz et al. | |
| 2007/0022099 A1 | 1/2007 | Yoshimura et al. | |
| 2007/0022109 A1 | 1/2007 | Imielinski et al. | |
| 2007/0073683 A1 | 3/2007 | Kobayashi et al. | |
| 2007/0078842 A1 | 4/2007 | Zola et al. | |
| 2007/0094183 A1 | 4/2007 | Paek et al. | |

(56) References Cited

U.S. PATENT DOCUMENTS

| | | |
|---|---|---|
| 2007/0094210 A1 | 4/2007 | Craig et al. |
| 2007/0094285 A1 | 4/2007 | Agichtein et al. |
| 2007/0118519 A1 | 5/2007 | Yamasawa et al. |
| 2007/0124291 A1 | 5/2007 | Hassan et al. |
| 2007/0136246 A1 | 6/2007 | Stenchikova et al. |
| 2007/0196804 A1 | 8/2007 | Yoshimura et al. |
| 2007/0203863 A1 | 8/2007 | Gupta et al. |
| 2008/0016147 A1 | 1/2008 | Morimoto |
| 2008/0049939 A1 | 2/2008 | Canetti et al. |
| 2008/0077570 A1 | 3/2008 | Tang et al. |
| 2008/0104065 A1 | 5/2008 | Agarwal et al. |
| 2008/0133671 A1 | 6/2008 | Kalaboukis |
| 2008/0154871 A1 | 6/2008 | Leidner et al. |
| 2008/0195378 A1 | 8/2008 | Nakazawa et al. |
| 2008/0288271 A1 | 11/2008 | Faust |
| 2009/0006207 A1 | 1/2009 | Datar et al. |
| 2009/0070311 A1 | 3/2009 | Feng |
| 2009/0089126 A1 | 4/2009 | Odubiyi |
| 2009/0112828 A1 | 4/2009 | Rozenblatt |
| 2009/0119261 A1 | 5/2009 | Ismalon |
| 2009/0192966 A1 | 7/2009 | Horvitz et al. |
| 2009/0192968 A1 | 7/2009 | Tunstall-Pedoe |
| 2009/0253112 A1 | 10/2009 | Cao et al. |
| 2009/0287678 A1 | 11/2009 | Brown et al. |
| 2009/0292687 A1 | 11/2009 | Fan et al. |
| 2010/0076998 A1 | 3/2010 | Podgorny et al. |
| 2010/0100546 A1 | 4/2010 | Kohler |
| 2010/0145976 A1 | 6/2010 | Higgins et al. |
| 2010/0019168 A1 | 7/2010 | Wang et al. |
| 2010/0191686 A1* | 7/2010 | Wang .............. G06F 17/30634 706/46 |
| 2010/0205006 A1 | 8/2010 | Bergh |
| 2010/0255455 A1 | 10/2010 | Velozo et al. |
| 2011/0087656 A1 | 4/2011 | Oh et al. |
| 2011/0119212 A1 | 5/2011 | De Bruin et al. |
| 2011/0125734 A1* | 5/2011 | Duboue .................. G09B 7/00 707/723 |
| 2011/0270883 A1 | 11/2011 | Bukai et al. |
| 2012/0054834 A1* | 3/2012 | King ...................... G06F 21/31 726/4 |
| 2012/0078062 A1 | 3/2012 | Bagchi et al. |
| 2012/0078837 A1* | 3/2012 | Bagchi ..................... A61B 5/00 706/52 |
| 2013/0019285 A1 | 1/2013 | Barborak et al. |
| 2013/0019286 A1 | 1/2013 | Barborak et al. |
| 2013/0066886 A1 | 3/2013 | Bagchi et al. |
| 2014/0205985 A1 | 7/2014 | Feng, Jr. |

FOREIGN PATENT DOCUMENTS

| | | |
|---|---|---|
| EP | 1284461 | 2/2003 |
| EP | 1391834 | 2/2004 |
| EP | 1653379 | 5/2006 |
| EP | 1793318 | 5/2008 |
| EP | 2886374 A2 | 6/2015 |
| JP | 2006126242 | 5/2006 |
| JP | 2008129449 | 8/2011 |
| WO | 0184376 A2 | 11/2001 |
| WO | 2006042028 | 4/2006 |
| WO | 2009140473 A1 | 11/2009 |
| WO | 2009143395 A1 | 11/2009 |

OTHER PUBLICATIONS

The MiPACQ Clinical Question Answering System—2011 Cairns et al.*

Office Action Communication dated Jun. 3, 2015, U.S. Appl. No. 13/570,680, pp. 1-23.

U.S. Office Action Communication dated May 21, 2014, U.S. Appl. No. 13/610,267, pp. 1-31.

U.S. Office Action Communication dated Oct. 30, 2014, U.S. Appl. No. 13/610,267, pp. 1-32.

Herdagdelen et al., "The Concept Game: Better Commonsense Knowledge Extraction by Combining Text Mining and a Game with a Purpose", Commonsense Knowledge Papers from the AAAI Fall Symposium, pp. 52-57, 2010.

Ethel ChuaJoy Ong, "A Commonsense Knowledge Base for Generating Children's Stories", Commonsense Knowledge Papers from the AAAI Fall Symposium, pp. 82-87, 2010.

Chang et al., "Human Computation Games for Commonsense Data Verification", Commonsense Knowledge Papers from the AAAI Fall Symposium, pp. 19-20, 2010.

Van den Bosch et al., "A Kid's Open Mind Common Sense", Commonsense Knowledge Papers from the AAAI Fall Symposium, pp. 114-119, 2010.

Havasi et al., "An Evaluation of the Brandeis Semantic Ontology", Computer Science Dept. Bradeis University, pp. 1-8, 2012.

Havasi et al., "Digital Intuition:Applying Common Sense Using Dimensionality Reduction", IEEE Intelligent Systems, 2009, pp. 1-12.

Lin et al., "Commonsense from theWeb: Relation Properties", Commonsense Knowledge Papers from the AAAI Fall Symposium, pp. 70-75, 2010.

Fan et al., "PRISMATIC: Inducing Knowledge from a Large Scale Lexicalized Relation Resource",Proceedings of the NAACL HLT 2010 First International Workshop on Formalisms and Methodology for Learning by Reading, pp. 122-127,Los Angeles, California, Jun. 2010.

Notice of Allowance Communication, U.S. Appl. No. 13/547,492, dated Jan. 30, 2015, pp. 1-22.

Notice of Allowance Communication, U.S. Appl. No. 13/563,838, dated Feb. 2, 2015, pp. 1-13.

U.S. Appl. No. 13/610,267. Office Action Communication, dated Feb. 22, 2016. pp. 1-37.

Office Action Communication dated Apr. 28, 2016. U.S. Appl. No. 13/610,355. pp. 1-55.

U.S.P.T.O. Office Action Communication, U.S. Appl. No. 13/610,267, dated May 8, 2017, pp. 1-28.

U.S.P.T.O. Office Communication, U.S. Appl. No. 13/610,267, Board Decision dated Mar. 1, 2017, pp. 1-10.

U.S. Appl. No. 13/610,267, Advisory Action dated Jan. 11, 2018, pp. 1-9.

U.S. Appl. No. 13/610,267, Office Action Communication dated Oct. 19, 2017, pp. 1-29.

Ferrucci et al., "Watson: Beyond Jeopardy!", IBM Research Report, Jun. 2, 2011, pp. 1-11.

U.S. Appl. No. 13/610,267, Office Action Communication dated Feb. 28, 2018, pp. 1-33.

U.S. Appl. No. 13/610,267, Office Action Communication dated Sep. 20, 2018, pp. 1-47.

Extended European Search Report for Application No./Patent No. 09747555.2/PCT/US2009043918, dated Dec. 3, 2015, 8 pages.

International Search Report and Written Opinion for International Application No. PCT/US 09/43918, International Filing Date: May 14, 2009, dated Jul. 6, 2009, 10 pages.

Pasca, "Question-Driven Semantic Filters for Answer Retrieval" International Journal of Pattern Recognition and Artificial Intelligence (IJPRAI), World Scientific Publishing, SI, vol. 17, No. 5, Aug. 1, 2003, pp. 741-756.

Cucerzan et al., "Factoid Question Answering over Unstructured and Structured Web Content", In Proceedings of the 14th Text Retrieval Conference TREC 2005, Dec. 31, 2005.

Molla et al., "AnswerFinder at TREC 2004", Proceedings of teh 13th Text Retrieval Conference TREC 2004, Dec. 31, 2004.

"Question Answering", Wikipedia, the free encyclopedia, http://en.wikipedia.org/wiki/Question_answering, last printed May 20, 2008.

Gotz et al., "Design and implementation of teh UIM, Analysis System", IBM Systems Journal, vol. 43, No. 3, 2004, http://www.research.ibm.com/journal/sj/433/gotz.html, last printed May 20, 2008, pp. 1-13.

Bontcheva et al., "Shallow Methods for Named Entity Coreference Resolution", TALN 2002, Nancy, Jun. 24-27, 2002.

Damljanovic et al.,"Natural Language Interfaces to Ontologies:Combining Syntactic Analysis and Ontology-Based Lookup through the User Interaction", 2010, pp. 1-15.

(56) References Cited

OTHER PUBLICATIONS

U.S. Appl. No. 13/547,492 Office Action Communication dated Aug. 1, 2014, pp. 1-43.
U.S. Appl. No. 13/547,492 Office Action Communication dated Nov. 17, 2014, pp. 1-19.
U.S. Appl. No. 13/563,838 Office Action Communication dated Nov. 14, 2014, p. 1-21.
U.S. Appl. No. 13/563,838 Office Action Communication dated Jul. 31, 2014, p. 1-45.
U.S. Appl. No. 13/610,267 Office Action Communication dated May 21, 2014, p. 1-31.
U.S. Appl. No. 13/610,267 Advisory Action Communication dated Feb. 4, 2015, pp. 1-4.
U.S. Appl. No. 13/564,023 Office Action Communication dated Mar. 18, 2014, pp. 1-32.
Sanda Harabagiu et al., Methods for Using Textual Entailment in Open-Domain Question Answering, 2010, pp. 905-912.
U.S. Appl. No. 13/547,436 Office Action Communication dated Oct. 10, 2013, pp. 1-26.
U.S. Appl. No. 13/547,436 Office Action Communication dated Jul. 21, 2014, pp. 1-25.
U.S. Appl. No. 13/547,436 Notice of Allowance dated 7/29/201, pp. 1-7.
Liu et al, "An Automatic Question Generation Tool for Supporting Sourcing and Integration in Students Essays", ADCS 2009—Australian Document Computing Symposium, Dec. 4, 2009, pp. 1-8.
Vanderwende, "The Importance of Being Important: Question Generation", Workshop on the Question Generation Shared Task and Evaluation Challenge, Microsoft, Sep. 2008, pp. 1-2.
Stanescu et al., "Question generation for learning evaluation", Proceedings of the International Multiconference on Computer Science and Information Technology, pp. 509-523, IEEE Computer Society 2008.
Papasalouros et al., "Automatic Generation of Multiple Choice Questions From Domain Ontologies", MCCSIS'08—IASIS Multi Conference on Computer Science and Information Systems; Proceedings of e-Learning 2008, v 1, pp. 427-434, 2008.
Ittycheriah, A. et al, entitled "{IBM}'s Statistical Question Answering System—{TREC}—Text {REtrievaij Conference" in 2001 at ttp://citeseer.ist.psu.edu/cache/papers/cs2/7/http:zSzzSztrec.nist. govzSzpubszSztrec1OzSz.zSzpaperszSztrec200.pdf/ittycheriah01ibms. pdf).
Jeongwoo et al, "Language-independent Probabilistic Answer Ranking for Question Answering", Jun. 1, 2007.
International Search Report and Written Opinion for International Application No. PCT/US 09/44924, International Filing Date: May 22, 2009, dated Jul. 14, 2009, 9 pages.
Extended European Search Report for Application No./Patent No. 09751623.1/PCTUS2009044924, dated Sep. 30, 2011, 7 pages.
Aditya Kalyanpur, Leveraging community-built knowledge for type Coercion in question Answering, issued in Semanticweb.org/fileadmin/ iswc/paper, in 2011.
Philipp et al., Ontologies and lexical Semantics in natural language understanding, issued Course at the ESSLLI Summer School—Aug. 2007.
Becker et al., "What a pilot study says about running a question generation challenge", AIED 2009: 14th International Conference on Artificial Intelligence in Education Workshop Proceedings, Jul. 6-7, 2009, Brighton, UK, pp. 1-8.
Boyer et al. "An Empirically-Derived Question Taxonomy for Task-Oriented Tutorial Dialogue", Proceedings of the 2nd Workshop on Question Generation, AIED 2009, pp. 9-16.
Computer Aided Environment for Generating Multiple Choice Test Items: Ruslan Mitkov, Cambridge University Press, Nov. 25, 2005.
Kanokphara et al., "Feature-Table-Based Automatic Question Generation for Tree-Based State Tying: A Practical Implementation", Department of Computer Science, University College Dublin, Ireland, Proceeding IEA/AIE'2005 Proceedings of the 18th International Conference on Innovations in Applied Artificial Intelligence, Springer-Verlag, London, UK, 2005.
Corbett et al., "Automating Comprehension Questions: Lessons from a Reading Tutor", Project Listen (www.cs.edu/~listen) School of Computer Science, Carnegie Mellon University, Pittsburgh, PA 15213, USA, 2008.
Ghani et al., "Automatic Web Search Query Generation to Create Minority Language Corpora", SIGIR'01, Sep. 9-12, 2001, New Orleans, Louisiana, USA, ACM 1-58113-331-6/01/009.
Gates, "Automatically Generating Reading Comprehension Look-Back Strategy Questions from Expository Texts", Carnegie Mellon University, May 14, 2008, pp. 1-36.
Moreda et al., "Automatic Generalization of a QA Answer Extraction Module Based on Semantic Roles*", Natural Language Processing Research Group, University of Alicante, Alicante, Spain, IBERAMIA 2008, LNAI 5290, pp. 233-242, 2008, Springer-Verlag Berline Heidelberg 2008.
Hirashima, "Increasing Problem Simplification as Scaffolding in Exercises", Proceedings of the 2nd Workshop on Generation, AIED 2009, pp. 58-65.
Sanjose et al., "Influence of Reading Goals on Question Generation", Proceedings of the 2nd Workshop on Question Generation, AIED 2009, pp. 53-57.
Rus et al., "Building Resources for an Open Task on Question Generation", Proceedings of the 2nd Workshop on Question Generation, AIED 2009, pp. 48-52.
Jean-Daubias et al., "Generation of exercises within the PERLEA project", Proceedings of the 2nd Workshop on Question Generation, AIED 2009, pp. 38-47.
Heilman et al., "Ranking Automatically Generated Questions as a Shared Task", Proceedings of the 2nd Workshop on Question Generation, AIED 2009, pp. 30-37.
Chen et al., "Generating Questions Automatically from Informational Text", Proceedings of the 2nd Workshop on Questions Generation, AIED 2009, pp. 17-24.
U.S. Appl. No. 12/724,156 Office Action Communication dated Feb. 13, 2014, pp. 1-29.
U.S. Appl. No. 12/724,156 Office Action Communication dated Jun. 22, 2012, pp. 1-36.
U.S. Appl. No. 12/724,156 Office Action Communication dated Jul. 18, 2013, pp. 1-26.
U.S. Appl. No. 12/724,156 Notice of Allowance dated Jun. 16, 2015, pp. 1-17.
U.S. Appl. No. 13/610,267 Office Action Communication dated Oct. 30, 2014, pp. 1-32.
Wang et al., "Automatic Question Generation for Learning Evaluation in Medicine", Lecture Notes in Computer Science (including subseries Lecture Notes in Artificial Intelligence and Lecture Notes in Bioinformatics) v 4823 LNCS, pp. 242-251, 2008, Advances in Web Based Learning—ICWL 2007—6th International Conference, Revised Papers, Springer Verlag.
Wyse et al., "Generating Questions from OpenLearn study units", Proceedings of the 2nd Workshop on Question Generation, AIED 2009, pp. 66-73.
Aldabe et al., "Ariklturri: an Automatic Question Generator Based on Corpora and NLP Techniques", Intelligent Tutoring Systems, 8th International Conference, ITS 2006, Proceedings (Lecture Notes in Computer Science vol. 4053), pp. 584-594, 2006.
Forascu et al., "Question Generation: Taxonomies and Data", Proceedings of the 2nd Workshop on Question Generation, AIED 2009, pp. 25-29.
Hobbs, "The Generic Information Extraction System", Artificial Intelligence Center, SRI International, Menlo Park, CA 94025, pp. 1-6.
Kim et al., "Design of Question Answering System with Automated Question Generation", 2008 Fourth International Conference on Networked Computing and Advanced Information Management (NCM), pp. 365-368, 2008, IEEE, Piscataway, NJ USA.
U.S. Appl. No. 13/610,267, Office Action Communication dated Jan. 24, 2019, pp. 1-35.

\* cited by examiner

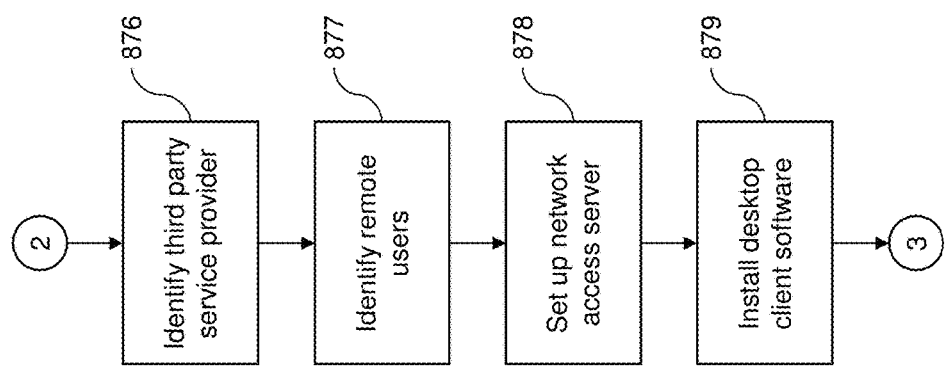

GENERATING SECONDARY QUESTIONS IN AN INTROSPECTIVE QUESTION ANSWERING SYSTEM

CROSS REFERENCE TO RELATED APPLICATIONS

The present invention claims the benefit under 35 U.S.C. § 120 as a continuation of U.S. patent application Ser. No. 13/610,267, filed on Sep. 11, 2012, the entire teachings of which are incorporated herein by reference.

This application is related to U.S. patent application Ser. No. 12/152,411 entitled "System and Method for Providing Answers to Questions," filed on May 14, 2008, now U.S. Pat. No. 8,275,803, issued on Sep. 25, 2012, U.S. patent application Ser. No. 12/126,642 entitled "System and Method for Providing Question and Answers with Deferred Type Evaluation," filed on May 21, 2008, now U.S. Pat. No. 8,332,394, issued on Dec. 11, 2012, U.S. patent application Ser. No. 12/724,156, entitled, "Questions and Answers Generation," filed on Mar. 15, 2010, now U.S. Pat. No. 8,630,499, issued on Jan. 14, 2014, U.S. patent application Ser. No. 13/547,492 entitled "Utilizing Failures in Question and Answer System Responses to Enhance the Accuracy of Question and Answer Systems," filed on Jul. 12, 2012, now U.S. Pat. No. 9,047,567, issued on Jun. 2, 2015, and U.S. patent application Ser. No. 13/547,436 entitled "Validating That a User Is Human," filed on Jul. 12, 2012, now U.S. Pat. No. 9,146,917, issued on Sep. 29, 2015, the entire teachings of each are incorporated herein by reference.

BACKGROUND

The present disclosure relates to question-answering (QA) systems, and more specifically, to a system and method to generate secondary questions to ask users from which the system can improve its ability to understand and answer questions.

In information retrieval, question answering (QA) is the task of automatically answering a question posed to the system. To find the answer to a question, a QA computer program may use either a pre-structured database or a collection of documents, such as a data corpus such as the World Wide Web or a local database. Question answer ("QA") systems occasionally produce failures in executing their tasks, such as providing an incorrect answer response to question inputs. Consequently, in order to enhance the efficiency and utility of QA systems, solutions are required to address these failures adequately.

SUMMARY

According to an embodiment herein, a method of generating secondary questions in a question-answer system is disclosed. Missing information is identified from a corpus of data using a computerized device. The missing information comprises any information that improves confidence scores for candidate answers to a question. The computerized device automatically generates a plurality of hypotheses concerning the missing information. The computerized device automatically generates at least one secondary question based on each of the plurality of hypotheses. The hypotheses are ranked based on relative utility to determine an order in which the computerized device outputs the at least one secondary question to external sources to obtain responses.

According to another embodiment herein, a computer implemented method of generating follow-on inquiries in a question answering system is disclosed. An automated question answering system operating on a computerized device attempts to answer a question. A plurality of candidate answers to the question is generated. A confidence score for each of the plurality of candidate answers is determined based on evidence used to generate the candidate answers. Missing information is identified from a corpus of data. The missing information comprises any information that improves confidence scores for candidate answers to the question. The computerized device automatically generates at least one follow-on inquiry based on each of the plurality of hypotheses. The hypotheses are ranked based on relative utility to determine an order in which the computerized device outputs the at least one secondary question to external sources to obtain responses.

According to another embodiment herein, a method is disclosed. A first question to be answered by a Question Answering (QA) system is provided to a processor. The processor creates a collection of candidate answers to the first question. The collection of candidate answers is created from a corpus of data. The processor generates supporting evidence for each candidate answer. An evidence analysis module identifies missing information from the corpus of data. The missing information comprises any information that improves confidence scores for the candidate answers. The processor generates a plurality of hypotheses concerning the missing information. The evidence analysis module produces a secondary question based on each hypothesis. The processor ranks the hypotheses based on relative utility to determine an order in which the QA system outputs the secondary question to external sources.

According to another embodiment herein, another method is disclosed. A question is received into a Question Answering (QA) system. The QA system compares the question to a corpus of data. The QA system creates a collection of candidate answers to the question from the corpus of data. The QA system identifies missing information from the corpus of data; the missing information comprises any information that improves a confidence score for at least one candidate answer in the collection of candidate answers. The QA system generates a plurality of hypotheses concerning the question and the collection of candidate answers. The QA system generates at least one follow-on inquiry based on each of the plurality of hypotheses. The QA system ranks the hypotheses based on relative utility to determine an order in which to output the at least one follow-on inquiry to external sources.

According to another embodiment herein, a computerized device for generating secondary questions in a question-answer system is disclosed. The computerized device comprises a question-answer system comprising software for performing a plurality of question answering processes and a corpus of data. A receiver receives a question into the question-answer system. A processor that generates a plurality of candidate answers to the question is connected to the question-answer system. The processor identifies missing information from the corpus of data; the missing information comprises any information that improves confidence scores for candidate answers to the question. The processor generates a plurality of hypotheses concerning the missing information. The processor generates at least one secondary question based on each of the plurality of hypotheses. The processor ranks the hypotheses based on relative utility to determine an order in which to output the at least one secondary question to external sources.

According to another embodiment herein, a computer system for generating follow-on inquiries in a question-answer system is disclosed. The computer system comprises an automated question answering (QA) system comprising a corpus of data, a processor, and a receiver. The processor has software for performing a plurality of question answering processes. The receiver receives a question into the automated QA system. The processor compares the question to the corpus of data and generates a plurality of candidate answers to the question from the corpus of data. The processor identifies missing information from the corpus of data; the missing information comprises any information that improves a confidence score for at least one candidate answer in the plurality of candidate answers. The processor generates a plurality of hypotheses concerning the question and the plurality of candidate answers. The processor generates at least one secondary inquiry based on each of the plurality of hypotheses. The processor ranks the hypotheses based on relative utility to determine an order in which the QA system outputs the at least one follow-on inquiry to external sources.

According to another embodiment herein, a question answering (QA) system is disclosed. The QA system comprises a processor. An evidence analysis module is connected to the processor. A first interface is connected to the processor. A corpus of data is connected to the evidence analysis module. The first interface receives a first question to be answered by the QA system. The processor creates a collection of candidate answers to the first question from the corpus of data. Each candidate answer has supporting evidence and a confidence score generated by the processor. The evidence analysis module identifies missing information from the corpus of data. The missing information comprises any information that improves confidence scores for the candidate answers. The processor generates a plurality of hypotheses concerning the missing information. The evidence analysis module produces a secondary question based on each hypothesis. The processor ranks the hypotheses based on relative utility to determine an order in which the QA system outputs the secondary question to external sources.

According to another embodiment herein, a non-transitory computer readable storage medium readable by a computerized device is disclosed. The computerized device comprises a question-answer system. The non-transitory computer readable storage medium stores instructions executable by the computerized device to perform a method. According to the method, missing information is identified from a corpus of data. The missing information comprises any information that improves confidence scores for candidate answers to a question. A plurality of hypotheses concerning the missing information is automatically generated. At least one secondary question is automatically generated based on each of the plurality of hypotheses. The hypotheses are ranked based on relative utility to determine an order in which to output the at least one secondary question to external sources to obtain responses.

BRIEF DESCRIPTION OF THE DRAWINGS

The embodiments herein will be better understood from the following detailed description with reference to the drawings, which are not necessarily drawn to scale and in which:

FIG. 13 is a schematic diagram of a virtual private network system according to embodiments herein.

DETAILED DESCRIPTION

Figure 1:
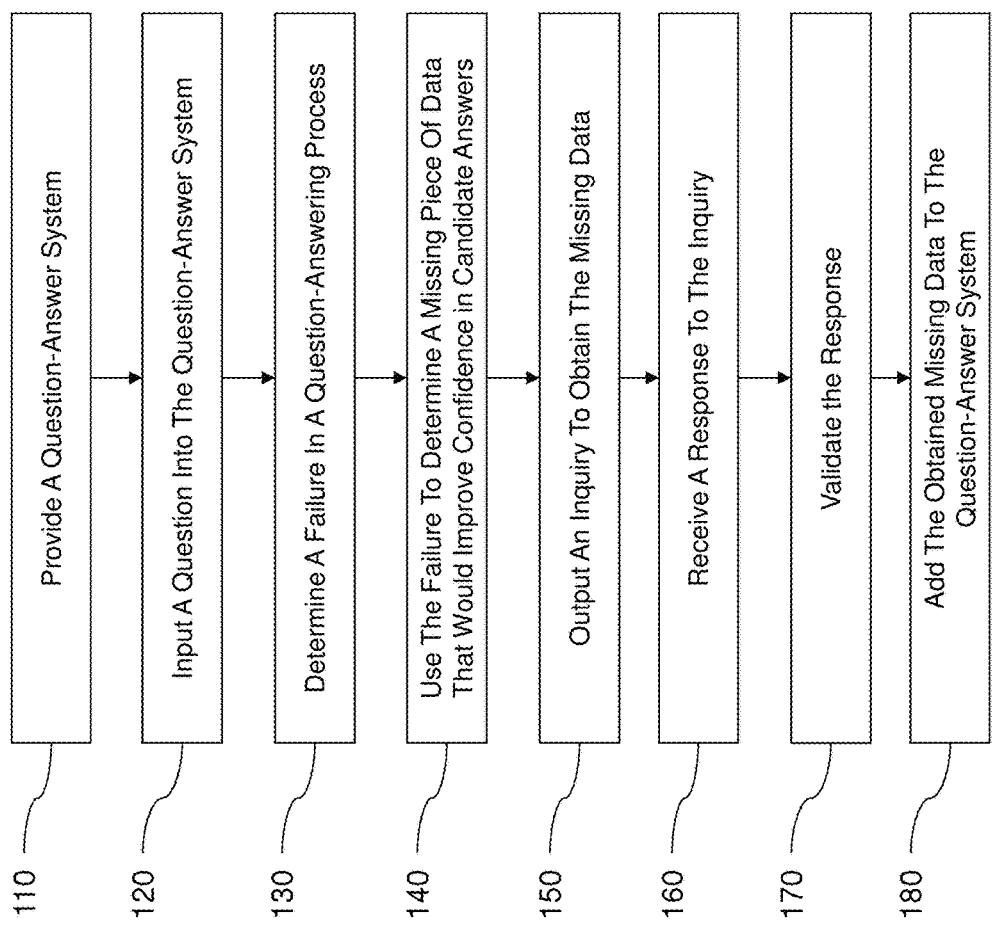
FIG. 1 is a flow diagram of a method according to an embodiment herein.

It will be readily understood that the embodiments herein, as generally described and illustrated in the figures herein, may be arranged and designed in a wide variety of different configurations in addition to the described embodiments. Thus, the following detailed description of the embodiments herein, as represented in the figures, is not intended to limit the scope of the invention, as defined by the appended claims, but is merely representative of selected embodiments. The following description is intended only by way of example, and simply illustrates certain selected embodiments herein.

The QA system described herein is not merely a document search system. One key difference between QA technology and simple document search technology is that a document search typically takes a keyword query and merely returns a list of documents, ranked in order of relevance to the query. On the other hand, QA technology takes a question expressed in natural language, seeks to understand it in detail, and returns a precise answer to the question. A typical scenario is for an end user to enter a question in natural language form, much as if they were asking another person, and for the system to sift through vast amounts of potential evidence to return a ranked list of the most compelling, precise answers. These answers may also include summaries of their justifying or supporting evidence, allowing the user to quickly assess the evidence and select the correct answer.

Given sufficient search data, a document search can usually find documents or passages containing some keywords in common with the query, but lacks the precision, depth, and understanding necessary to deliver correct answers with accurate confidence.

While an Internet web search engine has access to an immense source of information and can quickly find relevant web pages given a small number of query terms, such a search engine does not generate precise answers to the questions. A web search engine does not return answers; rather, it is designed to return a ranked list of web pages that the user may be trying to find.

A challenge for even finding the relevant documents is the issue of choosing the right set of keywords to retrieve those documents. Many questions contain information that is not necessary for answering the question, but is provided for educational and/or entertainment purposes. Moreover, the question may use terms that are different from those used in evidence that may contain a correct answer. As a result, formulating an effective query that returns the relevant documents is a critical and non-trivial task.

In some cases, the question requires an answer that must be synthesized from multiple pieces of evidence from multiple source documents; that is, the answer is a list of items or a logical combination of two or more items. These answers do not appear in any one place. Rather, the QA technology must synthesize the answer from independent sources to form a final answer.

Classic knowledge-based artificial intelligence approaches to QA systems try to logically prove an answer is correct from a logical encoding of the question and all the domain knowledge required to answer it. Such approaches are stymied by the prohibitive time and manual effort required to acquire massive volumes of knowledge and formally encode it as logical formulas accessible to computer algorithms and the difficulty of understanding natural language questions well enough to exploit such formal encodings, if available. Consequently, QA systems tend to falter in terms of breadth, but when they succeed, they are very precise.

Aspects of the various embodiments implement the use of failures in QA systems to motivate inquiries for common sense knowledge and employ crowd sourcing to respond to those inquiries. These failures can be used in QA processes to determine what common-sense knowledge would be useful to have in order to improve answer retrieval. One aspect of the QA system is to be able to discover and pose follow-on inquiries to a user (or an external expert community) that, if answered, will improve the ability of the QA system to understand and evaluate supporting evidence for questions. Furthermore, the acquired common-sense knowledge can be applied either off-line or during a live question answering session. Moreover, specific QA process failures can be identified and used to identify specific gaps in the system's common-sense knowledge, which can then be filled. Additionally, specific user-interface elements for common-sense knowledge questions are provided and employed.

According to embodiments herein, when the QA system is unable to obtain an answer with a high degree of confidence, the QA system generates and poses follow-on inquiries in order to acquire information that can change the degree of confidence in an answer. The QA system solicits responses to the follow-on inquiries from external sources either in online mode, in which case the external sources' response to the follow-on inquiry will influence the QA system's answer to the current question, or in offline mode, where follow-on inquiries are dispatched to an external expert community at a later time.

It is often the case that the information need is not well captured by the QA system, as the question processing part may fail to classify the question properly or the information needed for extracting and generating the answer is not easily retrieved. In such cases, the QA system may reformulate the question or request assistance from an outside source.

The use of an external source of information to obtain information is known in the art as crowd sourcing. Crowd sourcing is a process that involves sending tasks to a distributed group of people. In crowd sourcing, the task or problem is typically sent to an undefined public rather than a specific body. Using failures of the QA system to motivate inquiries for common sense knowledge and employing crowd sourcing to respond to those inquiries, embodiments herein can evaluate agreement among the various respondents regarding responses to the inquiries in order to validate that the respondents are human and that the responses were not generated by an automated script.

In some embodiments, a question may be related to an interrogatory searching for specific information, such as, "What is the capital of New York?" In some embodiments, a question may be posed in the form of an answer or statement, such as done in the popular game show "Jeopardy!"

FIG. 1 is a flow diagram illustrating one non-limiting embodiment herein. According to FIG. 1, one embodiment described herein enables a computer implemented method for enhancing the accuracy of a question-answer system in providing responses to questions input to the question-answer system.

The first step of the method, at 110, involves providing the QA system. The QA system uses multiple question-answering processes and evidence from a corpus of data to provide answers to questions. The details regarding processes and evidence for an example QA system that can be used in a preferred embodiment are described in U.S. patent application Ser. No. 12/152,411, incorporated herein by reference.

In the next step of the method, at 120, a question is input to the QA system. The question may be in the form of a statement or an answer seeking an appropriate question.

Next, at 130, a failure in a question answering process is determined. The QA system generates one or more candidate answers to the question, each candidate answer having an associated confidence score based on results from scoring processes/algorithms for pieces of evidence extracted from a corpus of data. A failure may result either from an inability to generate a candidate answer with a confidence score above a threshold value or if the QA system cannot interpret the question correctly. Additionally, a failure may result from an individual piece of evidence receiving a score below a threshold value.

At 140, the failure is used to determine a missing piece of information. The missing piece of data/information may be data/information that would enable the QA system to improve a score for a piece of evidence, for example a passage, wherein the score for the piece of evidence is used in a confidence score for a candidate answer. The missing information may be any item of data, a fact, a syntactical relationship, a grammatical relationship, a logical rule, a taxonomy rule, a grammatical rule, or any other information that would increase a determined score for a piece of evidence that may support or refute a candidate answer to the question.

Next, at 150, a follow-on inquiry is output to obtain the missing piece of information. The inquiry may be directed to outside sources that can include a variety of users in an expert community who may be human users or may be other electronic systems capable of providing a response, such as other QA systems. A follow-on inquiry may involve, for example, keyword matching, expansion of the original question, and/or a request for lexical semantic relationships. For example, the QA system might request a clarification of what sense a word is being used or what type of information is being requested in the question.

At 160, the QA system receives a response to the follow-on inquiry. The response is returned by a human user, expert community, or other QA system.

At 170, the response to the follow-on inquiry is validated to confirm the missing piece of data. The validation may include validation that the response is supported by a threshold number of experts, humans, or QA systems.

Finally, at 180, the obtained missing piece of data is added into the question-answer system. Again, the missing piece of data may be any item of data, a fact, a syntactical relationship, a grammatical relationship, a logical rule, a taxonomy rule, a grammatical rule, or any other information that would increase a determined score for a piece of evidence that may support or refute a candidate answer to the question. The missing piece of data may be input into the corpus, algorithm, process, logical rule, or any other location or combination thereof wherein the data may affect the resulting score for a piece of evidence.

In some embodiments, at least one step of the method is carried out using a computer device.

Figure 2:
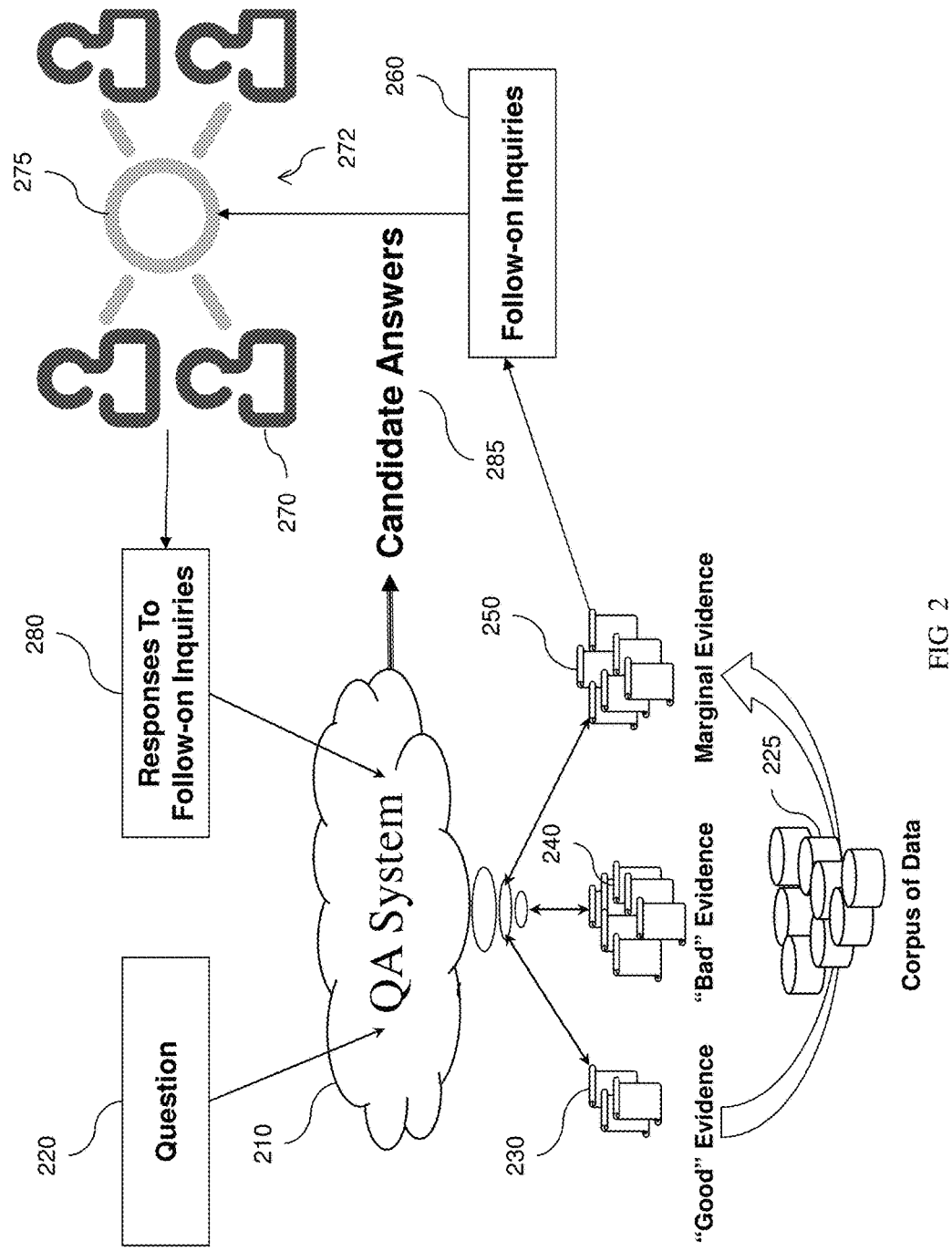
FIG. 2 is an illustration of aspects of a system according to an embodiment herein.

Referring to FIG. 2, a general workflow of the QA system 210 is shown. The QA system 210 receives a question or questions 220 and searches a corpus of data 225 to extract pieces of evidence 230, 240, 250 that are evaluated by a number of algorithms in order to generate candidate answers 285 to the question 220. The QA system 210 attempts to generate many candidate answers 285 to the question 220 presented. To do so, the QA system 210 considers a wide variety of information, e.g., texts of all kinds, web documents, reference books, novels, plays, encyclopedias, dictionaries, thesauri, textbooks, and technical reports, included in the corpus of data 225.

The corpus of data 225 includes quantities of digitally encoded, structured and unstructured information, such as fragments of documents, passages, internal or external knowledge bases, natural language documents, contents of corporate intranets, reference books, textbooks, technical reports, blogs, etc. These lists are intended to be non-limiting examples of sources of information for the QA system 210. The vast majority of the corpus of data 225 comprises a wide variety of natural language text. Some of the data may be structured (formal knowledge bases) and some of the data may be semi-structured (tagged text) or unstructured (untagged text) in order to help interpret text and refine answers.

As used herein, 'pieces of evidence' refers to the specific information or data that the QA system 210 evaluates to support or refute candidate answers 285 to the question 220. The QA system 210 draws pieces of evidence from the corpus of data 225. The term piece of evidence is not intended to limit the length of evidence used and may include a document, passage from a document, data, meta-data, one or more entries in a database, or any other information capable of contributing to a confidence score for a candidate answer. Additionally, as used herein, 'logical rules' refer to the lexical, grammatical, and/or semantic relationships that the QA system 210 uses to generate and score candidate answers 285 to the question 220 based on the pieces of evidence. The logical rules enable the QA system 210 to draw an inference from the pieces of evidence in order to evaluate the candidate answers 285.

In trying to generate and evaluate candidate answers 285, the QA system 210 extracts pieces of evidence from the corpus of data 225. The pieces of evidence, based on the question, can be fit into three categories: good evidence 230, bad evidence 240, and marginal evidence 250. The QA system 210 compares the question 220 to the data in the corpus of data 225 and assigns an evidence score to the extracted evidence based on how well the evidence matches the question 220. Sometimes there is data in the corpus of data 225 that clearly and directly relates to the input question. This is referred to as "good" evidence. Good evidence 230 is a piece of evidence with a high evidence score; that is, an evidence score above a previously established evidence threshold value such that it contributes significantly to a confidence score for a candidate answer. Conversely, bad evidence 240 is a piece of evidence with such low relevance that it does not contribute to a confidence score for a candidate answer. A QA system 210 may not extract bad evidence from the corpus, or may extract bad evidence in order to evaluate and determine outright that this evidence will not provide a candidate answer with any confidence. Lastly, there are also pieces of evidence that the QA system 210 is able to identify as relevant to the question, and may produce an evidence score that contributes significantly to a confidence score for a candidate answer if a missing link or missing piece of information is provided. A missing link or missing piece of information could be described as all the marginal evidence, or a subset of the marginal evidence (either all relatively high scoring marginal evidence, all relatively low scoring marginal evidence, or some middle range of scores for the marginal evidence (based on predetermined score parameters)). Thus, if a piece of marginal evidence falls within some predetermined score range, it would be considered a piece of missing information, for which additional information will be obtained. In other words, the marginal evidence 250 is evidence that the QA system 210 can use in generating and evaluating candidate answers 285, but is lacking in some manner, such that the score for the piece of evidence does not contribute significantly to the overall confidence score for a candidate answer 285. A low confidence score for all candidate answers 285 indicates that the QA system 210 should obtain additional information or assistance to further develop the confidence scores of the candidate answers 285. In other words, low confidence scores may serve as a trigger for the QA system 210 to evaluate whether pieces of evidence 230, 240, 250 for a candidate answer 285 are marginal evidence 250 such that a missing information or missing link may be identified.

The QA system 210 uses the good evidence 230 and the marginal evidence 250 to generate and evaluate candidate answers 285. Each candidate answer 285 is assigned a confidence score, which is an aggregation of the evidence scores. A candidate answer 285 with a low confidence scores; that is, confidence scored below a previously established confidence threshold value indicates that the QA system 210 should obtain additional information or assistance to further develop the confidence scores of the candidate answers 285. In other words, bad evidence does not contribute to the candidate answers 285, marginal evidence contributes only partially to the candidate answers 285, and good evidence provides high confidence in the candidate answers 285.

For a candidate answer generated, the QA system 210 evaluates a self-assessed probability that the candidate answer 285 is a correct answer to the question 220, or, in other words, the QA system 210 generates a confidence score for a candidate answer 285. In order to generate candidate answers 285, the QA system 210 analyzes the question to figure out what is being asked. It also analyzes the corpus of data 225 based on the question 220 in order to extract candidate answers 285 and computes a reliable confidence in light of whatever supporting or refuting pieces of evidence 230, 240, 250 it finds. To obtain confidence in a candidate answer 285, the QA system 210 attempts to justify the answer by multiple sources in the corpus of data 225. The degree to which the probability that the candidate answer 285 is a correct answer to the question 220 correlates to the confidence score for the candidate answer 285. The QA system 210 can then rank the candidate answers 285 based on the confidence scores.

The QA system 210 generates follow-on inquiries 260 to supplement the marginal evidence 250 by identifying an aspect of the piece of evidence that is lacking, in other words, identifying the missing piece of information or missing link. The QA system 210 uses follow-on inquiries 260 to clarify the aspect of the evidence that the QA system 210 failed to understand. According to an embodiment herein, the follow-on inquiries 260 are sent to an external source 272, which may include a community of potential respondents 270, which may be on an electronic network, such as the Internet 275. After the responses 280 to the follow-on inquiries have been evaluated, the validated responses may then be fed back into the QA system 210 as data, a fact, a syntactical relationship, a grammatical relationship, a logical rule, a taxonomy rule, a grammatical rule, or any other information that would increase a determined score for a piece of evidence that may support or refute a candidate answer to the question. The potential respondents 270 may be from an external expert community who may be human users or other electronic systems capable of providing a response, such as other QA systems. The responses 280 to the follow-on inquiries may include the missing information or missing link necessary to make the marginal evidence 250 useful in order to improve the confidence scores of one or more candidate answers 285. Such missing information can be used to produce improved candidate answers 285 to the input question or can be used to produce subsequent follow-on inquiries 260. In either case, the information can be used to enhance the internal knowledge base of the QA system 210 and improve the confidence in the candidate answers 285. The missing information included in the responses 280 to the follow-on inquiries can also help repair flaws in the question answering processes used by the QA system 210 by incorporating the information of the response, and the manner that provided the response, into the question answering processes.

Inputs to the QA system 210 may include questions 220, the evidence extracted from the corpus of data 225, and responses 280 to follow-on inquiries. Outputs from the QA system 210 include candidate answers 285 and follow-on inquiries 260. This provides low cost, continuous knowledge acquisition.

Figure 3:
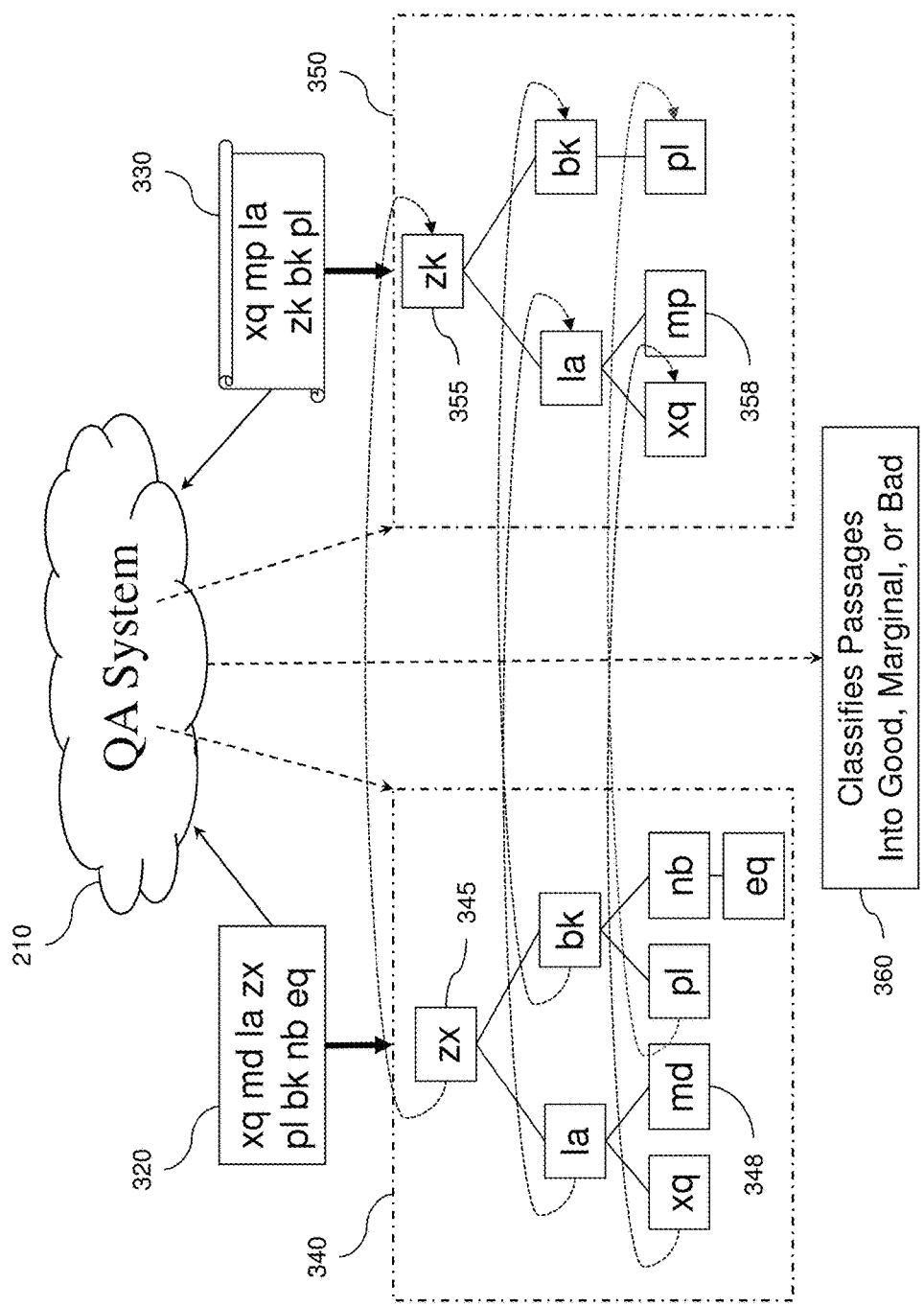
FIG. 3 is an illustration of aspects of a system according to an embodiment herein.

FIG. 3 shows one approach to identifying marginal evidence 250. The QA system 210 receives a question 320 and parses the question into a collection of elements 340. The QA system 210 searches the corpus of data 225 for a piece of evidence, for example a passage, such as 330, to support or refute a candidate answer 285 to the question 320. The QA system 210 parses the passage 330 into a collection of elements 350. The QA system 210 analyzes the passage 330 by seeking to match, or associate in some manner, the elements 340 in the question 320 and the elements 350 in the passage 330 based on lexical, grammatical, and/or semantic relationships. The QA system 210 may, for example, attempt to match the various individual elements, such as 345, 355 with corresponding semantic roles in the question 320 and the passage 330. The QA system 210 then classifies the passage as good, bad, or marginal, as indicated at 360. As used herein, 'marginal' means that some part of the passage 330 may be relevant, but it needs additional information to improve a score for the piece of evidence based on a scoring algorithm or process. This additional information can be labeled as a "missing link" or "missing information" that, when connected or combined with the other information in the passage 330, enables the QA system 210 to further develop the confidence score of the candidate answers 285.

In the approach illustrated in FIG. 3, the inputs to the QA system 210 include the question 320 and the passage 330 that is used for comparison to the question 320. Outputs from the QA system 210 include classification of the passage 330 into good, bad, and marginal matches to the question 320 or simply identification of the marginal evidence, without requiring identification of the good or bad evidence. The marginal evidence includes missing information; thus, follow-on inquiries 260 can be generated in order provide the missing information from an external source.

The QA system 210 may employ a variety of specific mechanisms for finding marginal evidence. Aligning questions to sample passages is one of the ways that the QA system 210 uses evidence to evaluate candidate answers 285. Given an answer key, it can be used to drive the search for near misses. In general, there are many kinds of "near miss" failures that the QA system 210 could encounter, for example:

Answer typing: the system could have determined that the answer had the correct type if only it had known that two types were equivalent.

Keyword search: the system could have found a relevant passage using a keyword search if only it had expanded some keyword in the clue; e.g., by synonyms, antonyms, related terms, etc.

Relation detection for knowledge-base lookup: the system could have looked up the answer in a knowledge base if only it had figured out what relationship the question was asking for.

Paraphrases: the system could have aligned more nodes in question elements 340 and passage elements 350 in FIG. 3 if it had known that some terms, such as "md" 348 and "mp" 358 are synonyms, or that some texts in the question 320 and in the passage 330 are paraphrases of each other.

Each kind of near miss can imply some kind of semantic inquiry.

In some embodiments, mismatched elements, such as "zx" 345 and "zk" 355, may actually be equivalent or have a counterpart as a logically necessary consequence. A follow-on inquiry 260 can be used to determine whether the mismatched elements are equivalent. Such follow-on inquiry 260 can use the equivalence to decide if the passage 330 aligns with the question 320, and can also be used to resolve similar alignment problems in future questions.

The QA system 210 analyzes lexical, grammatical, and semantic relationships of the words within each question 320; therefore, the QA system 210 breaks each question 320 down into many separate elements 340 (including keywords, equivalent keywords, logical relationships, restrictions, subject categories, etc.). For example, the good evidence 230 matches a sufficient number of the elements to provide a high score for the piece of evidence; that is, a score above a threshold value that contributes significantly to a confidence score for a candidate answer 285. In other words, the marginal evidence 250 matches some of the elements of the question 320, but not all such elements resulting in a score for the piece of evidence below a previously established threshold value. The systems and methods herein identify the elements of the question 320 that the marginal evidence elements were not able to match. Thus, the systems and methods herein identify the portions of the question 320 that were not provided by the marginal evidence 250, and generate follow-on inquiries 260 to request the external sources 272 to supply information to clarify the portions of the question 320 that were not provided by the marginal evidence 250. In some embodiments, the follow-on inquiries 260 may use a natural language format.

In other words, the systems and methods herein automatically identify the missing link that, if known, would increase the confidence score for one or more candidate answers 285. This missing link can be an item of data, a fact, a syntactical relationship, a grammatical relationship, a logical rule, a taxonomy rule, a grammatical rule, etc. By generating the follow-on inquiry, systems and methods herein can receive a number of responses (from, for example, a crowd sourcing environment). These responses can be filtered to make sure that the responses are from actual humans (as opposed to computerized answering systems), for example, based on responses to supply missing information that a machine would have trouble answering. Additionally, the responses can be filtered to make sure that the responses are above a certain level of accuracy (based upon the reputation of the responder, correlation with the known correct answer, agreement of the responses with one another, etc.). Then, once the responses are filtered, the high-quality, human-based responses can be utilized to increase the knowledge base of the question answer system and/or used to generate additional rules to help the question answer system score and rank the candidate answers 285.

Figure 4:
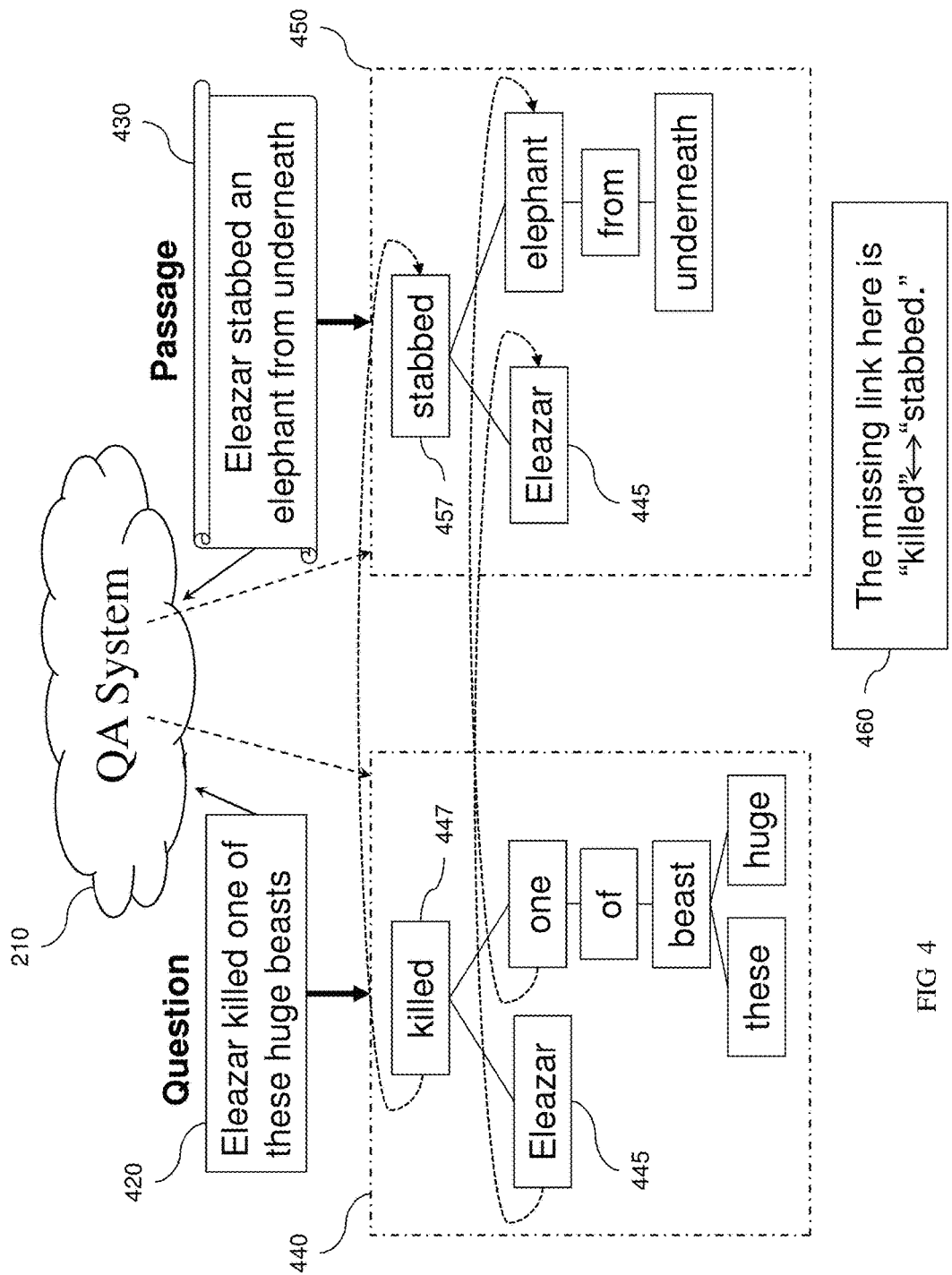
FIG. 4 is an illustration of aspects of a system according to an embodiment herein.

FIG. 4 exemplifies a practical application of the approach to identify marginal evidence illustrated in FIG. 3. In FIG. 4, the QA system 210 compares the question 420 to the passage 430. In the example of FIG. 4, the question 420 is "Eleazar killed one of these huge beasts." In other words, the question 420 is looking for an answer as to what type of beast was killed by Eleazar. In other aspects of the QA system 210 not shown, the piece of evidence, or passage 430, has been identified as relevant to answering the question 420. In performing the analysis between the passage 430 and the question 420, the QA system 210 evaluates the text for lexical, grammatical, and/or semantic relationships among the elements 440 of the question 420 and the elements 450 of the passage 430. In the example of FIG. 4, the QA system 210 can match some elements, such as Eleazar 445, to conclude that the passage is of some relevance. The QA system 210 may be able to determine that an "elephant" is a "huge beast". However, the QA system 210 may not be able to determine that "stabbed" 457 and "killed" 447 have a logical relationship. This failure of the QA system 210 reveals missing information or a missing link 460. In this example, the missing link is to resolve whether "killed" 447 is logically related to "stabbed" 457. According to an embodiment herein, the system concludes that the passage 430 would receive a higher score and contribute more significantly to the confidence score for a candidate answer 285 of "elephant" if "killed" is logically related to "stabbed." Therefore, in this example, the systems and methods herein could generate a follow-on inquiry 260 that asks for a crowd source response to the question "does stabbing imply killing?" If the response 280 to this follow-on inquiry is to the affirmative, the systems and methods herein can automatically learn that the two words may be synonyms.

Figure 5:
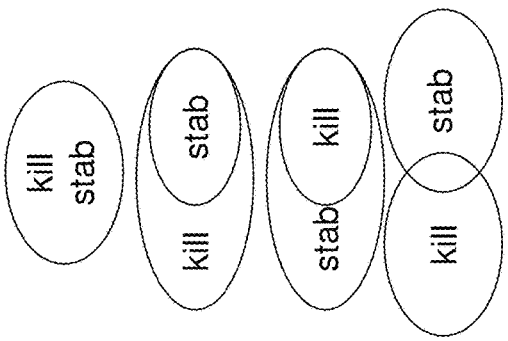
FIG. 5 is an illustration of inquiry examples according to an embodiment herein.

According to an embodiment herein, FIG. 5 provides examples of some specific examples of follow-on inquiries 260. As illustrated in Example 1 of FIG. 5, natural language follow-on inquiries 510 are actual natural language questions generated by the QA system 210 that can be supplied directly to external sources 272, such as another QA system, another information source, or human respondents 270 on an electronic network (such as the Internet 275), so that the QA system 210 can acquire the missing information needed to better respond to the question 220.

As illustrated in Example 2 of FIG. 5, given the context of the question and passage, the follow-on inquiries can be multiple-choice taxonomies using text and/or diagrams 515. As would be known in the relevant art, synonyms are different words with similar or almost identical meanings, a hyponym is a word or phrase whose semantic field is included within that of another word; for example: rose is a hyponym of flower, and a hypernym is a word with a general meaning that has basically the same meaning of a more specific word; for example, the word "color" is a hypernym for red, green, blue, brown, etc.

By acquiring responses in a crowd sourcing manner, the systems and methods herein allow the QA system 210 to answer questions more similarly to a human expert and to be customized for different localities. More specifically (with reference to answering the question of FIG. 4), purely logical rules may require that the correct answer in the multiple-choice example 515 be selection "D" because "stab" and "kill" sometimes overlap, but not always (surely logically eliminating answers A-C). However, depending upon local speech customs, "killing" and "stabbing" can be considered synonyms. By automatically learning that "killing" and "stabbing" are considered synonyms in a sufficient number of situations, the systems and methods herein allow the QA system 210 to answer questions with higher confidence, and provides more flexibility in its word definitions and grammatical/logical rules. The ability of the systems and methods herein to automatically learn of human peculiarities by utilizing crowd sourced responses allows the QA system 210 to respond more consistently as a human would when generating answers to questions. This further underscores the need to filter out responses 280 to the follow-on inquiry that do not come from humans because non-human responses may give the correct, albeit purely logical response, if supplied by a machine-based answering system. The QA system 210 herein is able to receive information a human would consider to be a correct response (even if such a response might not be the most correct answer in a purely logical sense).

Systems and methods herein enable a process by which the QA system 210 generates follow-on inquiries 260 to direct to an external source 272, such as an expert community. The QA system 210 uses the responses 280 from the follow-on inquiries to improve its ability to understand and generate candidate answers to questions 220. The QA system 210 may generate hundreds, if not thousands, of candidate answers to the input question 220 and, similarly, develop hundreds, if not thousands, of possible follow-on inquiries 260 to acquire the missing information.

Figure 6:
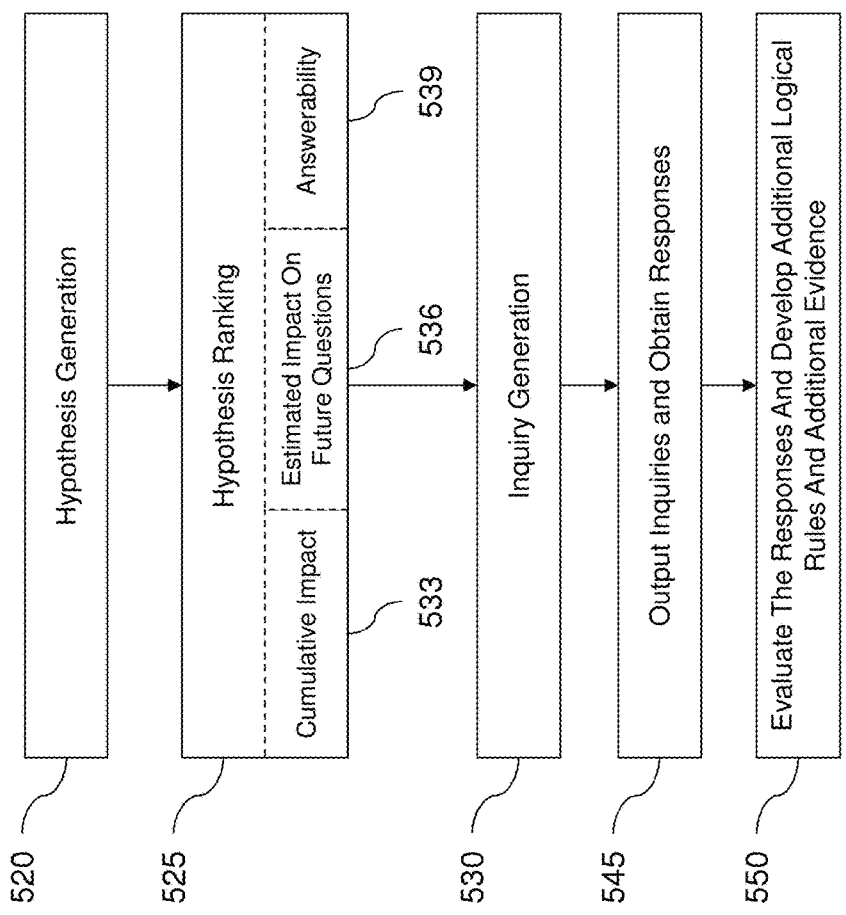
FIG. 6 is a flow diagram illustrating aspects of a process according to an embodiment herein.

Referring to FIG. 6, the process of generating the follow-on inquiries includes three main steps: Hypothesis Generation 520, Hypothesis Ranking 525, and Inquiry Generation 530. The process starts with processing results of the QA system 210 on one or more questions 220 and ends with identifying follow-on inquiries 260. In some embodiments, the follow-on inquiries 260 may be placed in storage for later use, such as crowd sourcing for answers.

The hypothesis generation step 520 takes the results of the QA system's processing of the current question 220 as input, including the ranked list of candidate answers 285, and all the evidence that supports and refutes each candidate answer 285. By analyzing the supporting evidence for the candidate answers 285, the QA system 210 identifies "missing information", which is information that the QA system 210 deems that, if known, will affect its ranking of the candidate answers to the question 220. For example, a piece of missing information may be how "stab" and "kill" are related to each other. Hypotheses that may be generated from this piece of missing information may include "stab equals kill", "stab is a hypernym of kill", "stab is a hyponym of kill", etc. Based on its analysis, the QA system 210 generates general linguistic and common sense hypotheses that it believes will help the QA system 210 better evaluate the evidence extracted from the corpus of data 225 for the question 220. In the hypothesis generation step 520, the QA system 210 attempts to deal with a wide range of question types including questions pertaining to How and Why and questions presented in the form of a statement/answer. In the hypothesis generation step 520, the QA system 210 analyzes an input question 220. From the question analysis, the QA system 210 generates and evaluates candidate answers using a variety of question answering processes. In the methods herein, the QA system 210 analyzes an input question 220 to determine precisely what it is asking for. The QA system 210 generates many possible candidate answers through a broad search of large volumes of evidence. For each of the candidate answers, a hypothesis is formed based on considering the candidate answer in the context of the original question and topic. For each hypothesis, the QA system 210 spawns an independent thread that attempts to prove it. The QA system 210 then searches its corpus of data 225 for evidence that supports or refutes each hypothesis. For each evidence-hypothesis pair, the QA system 210 applies several analyses that dissect and analyze the elements of the question and passage along different dimensions of evidence, such as type classification, time, geography, popularity, passage support, source reliability, and semantic relatedness. This results in a very large number of hypotheses and candidate answers.

According to embodiments herein, the QA system 210 exploits natural language processing and a variety of search techniques to analyze unstructured information to generate likely candidate answers for hypothesis generation (analogous to forward chaining). Forward chaining is one method of reasoning in artificial intelligence systems when using inference rules. Forward chaining starts with the available data and uses inference rules to extract more data (from an external source 272, for example) until a goal is reached. An inference engine using forward chaining searches the inference rules until it finds one where the antecedent (IF clause) is known to be true. When found, it can conclude, or infer, the consequent (THEN clause), resulting in the addition of new information to its data. The inference engine will iterate through this process until a goal is reached. Because the data determines which rules are selected and used, forward chaining is often referred to as data-driven, in contrast to goal-driven.

Potentially, a very large number of candidate answers and hypotheses can be generated when a collection of questions is analyzed and missing information identified. Since there is a cost associated with validating each hypothesis, embodiments herein seek to determine what information is most important for a follow-on inquiry 260. To that end, once hypotheses are generated at 520, the hypotheses are assessed along a number of dimensions in order to rank a set of hypotheses based on their relative utility; that is, the hypotheses are ranked so that the most important follow-on inquiries 260 are asked first. In the hypothesis ranking step 525, the QA system 210 analyzes the various hypotheses. The ranking processes used by embodiments herein range from simple heuristics rules using shallow lexical pattern matching to deeper semantic reasoning supported by evidence sources and domain ontologies. As an example of a simple heuristic, the presence of certain keywords, or their combinations, in the question and passage could be used to assign a ranking value. This rank is used to determine the order in which the QA system 210 will present follow-on inquiries 260 to the external sources 272 to acquire responses for the follow-on inquiries 260. Some factors that affect a hypothesis' ranking include but are not limited to:

1. Cumulative Impact 533 on all candidate answers based on the responses to one or more follow-on inquiries—this can be assessed by assuming that the given hypothesis is true and determining its impact on affecting the system performance on a set of seen questions from which the hypothesis was generated
2. Estimated impact on future questions 536 in the corpus of data 225—this can be determined by determining the likelihood that the hypothesis will appear in relevant content for future questions. The system can estimate the likelihood by using a large background corpus of English text (or domain specific text if the QA system specializes in a particular domain) and computing the frequency that the terms (such as "stab" and "kill") appear in the text; this frequency is used to estimate the likelihood that the terms will show up in future questions
3. Answerability 539—likelihood that an intuitive and answerable question may be formulated for a human expert. One aspect of answerability is based on the domain specificity of the question; for example, a question that involves specific medical or legal terminology may require experts in those areas to answer correctly and therefore would have lower answerability for the general public.

The hypothesis analysis produces several features. These features are then combined based on their learned potential for predicting the right answer. The result of the hypothesis analysis process is a ranked list of candidate answers, each with a confidence score indicating the degree to which the answer is believed correct. In some embodiments, the ranked list may include a link back to the evidence that suggested the answer.

The evidence collection and scoring is analogous to backward chaining. Backward chaining is the opposite of forward chaining. Backward chaining starts with a list of goals (or a hypothesis) and works backwards from the consequent to the antecedent to see if there is data available that will support any of the consequents.

In the inquiry generation step 530, the QA system 210 converts a hypothesis into a human understandable question. This is done with the aid of the original question 320/passage 330 pair, using semantic concepts, relations, and data, as well as using background knowledge. Inquiries can take a wide variety of forms, for example, but not limited to, simple Yes/No questions, questions requiring responses on a qualitative scale (e.g. Strongly Disagree-Somewhat Disagree-Neural-Somewhat Agree-Strongly Agree), or a quantitative response. Hypotheses need to be rendered for interaction with users in human readable forms. This may be a question as simple as: "Does stab mean the same as kill?" However, in some cases, the context in the original question may come into play. For example, "contraindicate" and "do not give" may mean the same thing when it comes to prescribing medication, but "do not give your child a lollipop before dinner" does not mean that it is contraindicated.

According to embodiments herein, the QA system 210 uses natural language processing, and searches over structured and unstructured information to find evidence for ranking and scoring answers based on natural language content. Search collections vary from small local document collections, to internal organization documents, to the World Wide Web. The direct use by the QA system 210 of readily available knowledge in natural language content makes it more flexible, maintainable, and scalable, as well as cost efficient in considering vast amounts of information and staying current with the latest content.

At 545, one or more follow-on inquiries 260 may be stored in a database from which a processor of the QA system 210 draws questions and into which it stores responses to them. In the case of online interactions, the follow-on inquiry 260 may be posed to an external source 272 who is interacting with the QA system 210 right away so that the results can be used to influence the answer 285 by the QA system 210 in the current interaction.

According to embodiments herein, the QA system 210 can receive a number of responses, for example, from a crowd sourcing environment or an external expert community. These responses can be filtered to make sure that the responses are from actual humans, as opposed to computerized answering systems, and that the responses are above a certain level of accuracy either based upon the reputation of the responder, correlation with the known correct answer, or agreement of the responses with one another. Then, at 550, once the responses are filtered, the high-quality responses can be utilized to increase the knowledge base of the QA system 210, and also used to generate additional rules and evidence to help the question answer system generate candidate answers in the future.

An additional example of the use of follow-on inquiries is described below: Question: This star of "Emmerdale Farm" also plays Elvis in "If You Ever Get to Heaven."

In this example, the question is looking for a "star"; however, the QA system 210 may not know if that means a star in the sky or a star on the stage. An appropriate answer to the question is "Samuel Kane". It is possible that a first source from the corpus of data identifies Samuel Kane as an actor. However, the QA system may not be able to determine that Samuel Kane is a "star." As such, the QA system has identified missing information or a missing link regarding the lexical relationship between an actor and a star. In an embodiment herein, the QA system 210 may direct some follow-on inquiries. Some examples of follow-on inquiries may include:
  Is every actor a star?
  Is every star an actor?
  Are most actors also stars?
  Are many actors also stars?
  If I know that some entity is a star, would I suspect that this entity is an actor?
  If I know that some entity is an actor, would I suspect that this entity is a star?
  If I know that some entity is an actor, can I be certain that this entity is a star?

Using follow-on inquiries, the QA system 210 tries to determine more about being an actor and being a star. By evaluating the responses to the follow-on inquiries, the QA system 210 determines that this question is asking for a "star." If the QA system 210 finds a possible answer that is an actor, can it be certain that this answer is a star? Conversely, if the QA system 210 finds a possible answer that is an actor, should it suspect that this answer is a star? According to one resource, the QA system 210 has found a possible answer: Samuel Kane. Based on that information, the QA system 210 believes that Samuel Kane is an actor. Should the QA system 210 conclude that Samuel Kane is a star because it believes that Samuel Kane is an actor? Should the QA system 210 suspect that Samuel Kane is a star because it believes that Samuel Kane is an actor?

An additional example herein employs question expansion to generate follow-on inquires, as follows:
Question: "This television quiz show host from Mexico was born in the last few days of the 60's."

In this example, the question is looking for several specific elements. An appropriate answer to the question is "Marco Antonio Regil." According to an embodiment herein, the QA system 210 uses the question text to build a keyword search question. The QA system 210 considers many possible expansions of the question; e.g., show is related to program, born is related to birth, television is related to TV, etc. There is a relevant piece of evidence or passage that states, "Marco Antonio Regil (born Dec. 27, 1969) is a Mexican television personality and game show host, born in Tijuana, Mexico." An embodiment herein can find this relevant passage since it contains the correct answer and some keywords from the clue. The QA system 210 can then look for expansions to the original question that would have produced this passage. The QA system 210 finds several expansions: quiz show is related to game show, Mexico is related to Mexican, 60's is related to 1969. These could be used as training data to train a more effective question expander if they are actually implied by the clue. Thus, this embodiment can enable the following follow-on inquiries:
  If a question is requesting information about a quiz show, can I be certain that information about a game show is relevant?
  If a question is requesting information about a quiz show, should I be suspect that information about a game show is relevant?
  If a question is requesting information about the 60's, can I be certain that information about 1969 is relevant?
  If a question is requesting information about the 60's, should I be certain that information about a 1969 is relevant?

Additionally, the QA system 210 can present follow-on inquiries 260 to potential respondents 270 (internet users, other QA system, etc.) requesting potential respondents 270 to rank the terms of the question from most relevant to the topic of this question to least relevant:
  a) game show
  b) birth
  c) Mexican
  d) program
  e) TV
  f) 1969

The QA system 210 can present follow-on inquiries 260 to potential respondents 270 (internet users, other QA system, etc.) requesting potential respondents 270 to rate the terms on a number scale based on relevance to the topic of this question, for example rate from 1-10 in term of relevance the following terms:
  a) game show
  b) birth
  c) Mexican
  d) program
  e) TV
  f) 1969

Another embodiment herein employs relation detection for knowledge-based lookup to generate follow-on inquiries. An example of relation detection is described below: Question: "She appeared on the big screen as Rachel Powell in the Hollywood blockbuster K-PAX."

In this example, the question is looking for a specific person's name. An appropriate answer to the question is "Mary McCormack." According to an embodiment herein, the QA system 210 may use the question text and a structured knowledge base to arrive at the correct answer. The structured knowledge base may have an entry labeled Role_In_Movie ("Mary McCormack", "Rachel Powell," "K-PAX"). Thus, the QA system 210 would have gotten the answer correct had it concluded that the question was asking for the specific variable that satisfies the following structured question: played_Role_In_Movie (???, "Rachel Powell," "K-PAX"). However, the system does not have a detection pattern for Played_Role_In_Movie that matches this clue. It does have a pattern for Played_Role_In_Movie (X,Y,Z) of the form "X played Y in Z". Thus, it knows that if the text had been "She played Rachel Powell in K-PAX," then it would have detected this relation and gotten the question right; and as such, it could present a context like this to the respondents 270. However, the QA system 210 did not fully understand the following question: "She appeared on the big screen as Rachel Powell in the Hollywood blockbuster K-PAX." It thinks it may be able to simplify this question into the following question: "She played Rachel Powell in K-PAX." It could then present one or more of the following questions given this context: Is this a valid simplification? Can you imagine a correct answer to the simplified form that is not a correct answer to the original question? Can you imagine a correct answer to the original question that is not a correct answer to the simplified form? The original question uses the word "Hollywood" but the simplified form does not. Is "Hollywood" implied in the simplified form? The original question uses the word "Hollywood" but the simplified form does not. Is "Hollywood" a very important concept for answering this question? Please rank the following terms from the original clue that are not in the simplified form as most important to least important in terms of what was lost in simplifying:

a) appeared
b) big
c) screen
d) Hollywood
e) blockbuster

To compute the confidence scores for the candidate answers, the QA system 210 uses several criteria: e.g., is the candidate answer satisfying similar lexical and semantic relations (e.g. for a query about an actress starring in a movie, is the candidate answer a female, and does the candidate answer satisfy actor-in-movie relation?); how well does the candidate answer and the query align; how well do the terms match, and do the terms exist in similar order.

The language and knowledge processing infrastructure of the QA system 210 combines statistical and heuristic techniques to assess its own knowledge and produce its best candidate answer 285 with an accurate confidence—a measure of the likelihood it is correct based on a self-assessment of its sources, inference methods, and prior performance. Unfortunately, some of the respondents 270 on the Internet 275 may provide incorrect or misleading result. As noted above, the systems and methods herein can utilize a crowd sourcing technique to obtain responses to the follow-on inquiries 260. Crowd sourcing involves asking external sources 272, such as an expert community, which can be many human Internet/computer users, to provide individual responses to the follow-on inquiries. Understandably, some of the responses from some respondents 270 will be incorrect. However, the "correctness" of the response is a relative statement because, as shown above in the examples in FIG. 5, some semantic and grammatical human ways of asking and answering questions may not be purely logically "correct." Therefore, what is considered a strong synonym by humans may not be considered a synonym under purely logical rules. Thus, the systems and methods herein learn what the majority of the respondents 270 consider to be the "correct" responses to the follow-on inquiries and use such as a standard of what is "correct" in order to become more humanlike.

Further, what is considered to be the "correct" response to a follow-on inquiry 260 can vary from geographic place to place, depending upon local language usage of humans in the different areas. Therefore, the systems and methods herein not only learn from the majority of all respondents as to what is "correct", but also learn what the "correct" response is for each of the different geographic areas in which the QA system 210 may be utilized. That is, what may be considered a very close synonym is North America may not be considered a synonym at all in Ireland despite sharing the common English language. The systems and methods herein, therefore, learn what humans consider to be the correct answer component on many different levels.

All of the above schemes and methods enable a QA system to expand its knowledge base as can be contained in a database, correct its processes for future questions using external sources, such as human users on a network or other QA systems, and generally increase its accuracy. As should be apparent, the external or outside sources referenced throughout this application, whether explicitly stated or not, include, but are not limited to, sources accessible to the QA system 210 such as human sources, electronic sources, such as another QA system, or any other source accessible by the QA system 210 that is capable to facilitate responses to the QA system 210 according to the principles embodied in the present disclosure.

The QA system 210 described herein is an application of advanced natural language processing, information retrieval, knowledge representation and reasoning, and machine learning technologies to the field of open-domain question answering using technology for hypothesis generation, massive evidence gathering, analysis, and scoring. In addition to identifying an answer 285, the QA system 210 described herein determines a confidence in its answer 285. If that confidence is low, the system realizes that it may not understand the question. For example, there may be a pun or some syntax that the QA system 210 does not understand. On the other hand, if the confidence is high, the QA system 210 knows it likely understood the question and stands a good chance of getting that question right. Having sufficient information, the QA system 210 can always find documents or passages containing some keywords in common with the question but may lack the precision, depth, and understanding necessary to deliver correct answers with accurate confidence.

The present invention applies to all QA systems now known and as may be developed in the art, and can be implemented by computer or electronic devices now know (or that may become known) in the art.

According to an embodiment herein, a question answering (QA) system includes a processor, an evidence analysis module connected to the processor, a first interface connected to the processor and a second interface connected to the processor, and a corpus of data connected to the evidence analysis module. The QA system is the type capable of producing evidence in support of a candidate answer. A first question to be answered by the QA system is provided through the first interface. The processor creates a collection of candidate answers to the first question from the corpus of data. Each candidate answer has supporting evidence and a score generated by the processor. The evidence analysis module produces a second question (i.e. follow-up inquiry) based on the supporting evidence. The processor presents the second question through the second interface to one or more users. The processor receives at least one response or knowledge item from one or more users through the second interface. The processor validates the at least one response. In some embodiments, the processor inputs validated responses into the corpus of data to improve the ability of the QA system to answer questions. The new response or knowledge item changes the supporting evidence for the first question and the scores for the candidate answers. Based on the changed evidence, the QA system generates an answer to the first question through the first interface. The system can be scaled up or down depending on different application requirements.

Figure 7:
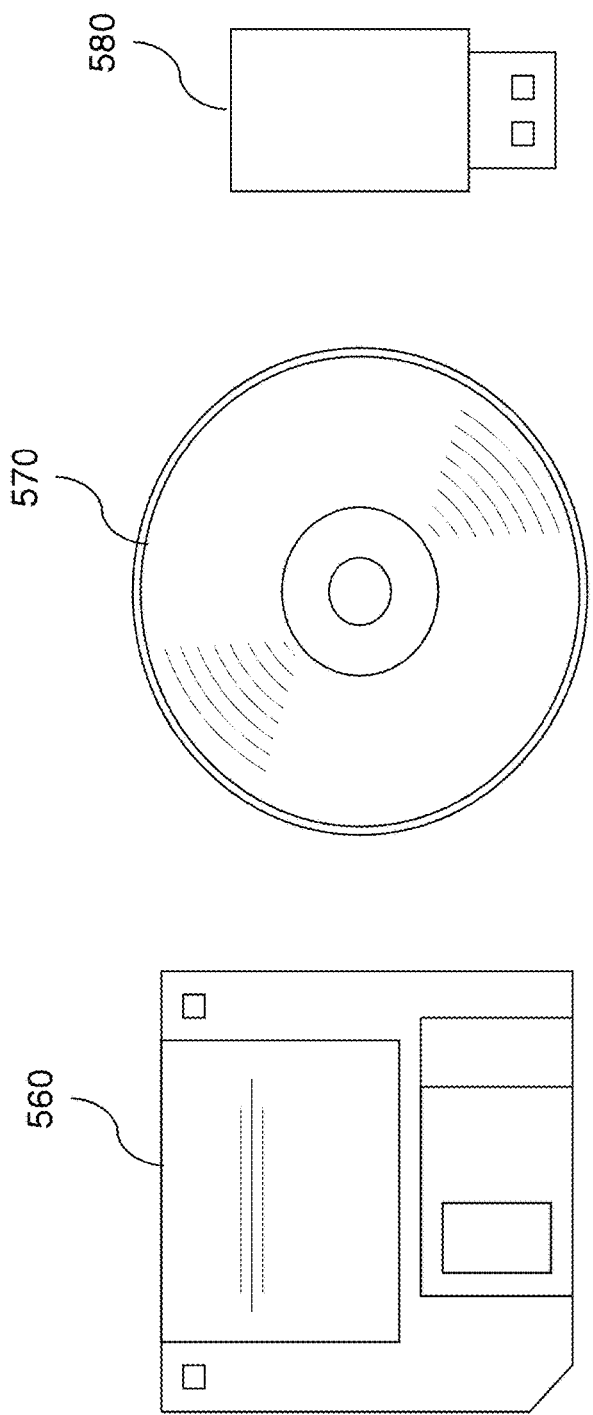
FIG. 7 is an illustration of articles of manufacture according to embodiments herein.

According to a further embodiment herein, an article of manufacture is provided that includes a computer readable medium having computer readable instructions embodied therein for performing the steps of the computer implemented methods, including, but not limited to, the methods illustrated in FIGS. 1 and 6. Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. FIG. 7 illustrates exemplary articles of manufacture, such as, a magnetic storage device 560, a portable compact disc read-only memory (CD-ROM) 570, and a "plug-and-play" memory device 580, like a USB flash drive. Any of these devices may have computer readable instructions for carrying out the steps of the methods described above with reference to FIGS. 1 and 6.

Aspects of the present disclosure are described herein with reference to flowchart illustrations and/or block diagrams of methods, apparatus (systems) and computer program products according to various embodiments. It will be understood that each block of the flowchart illustrations and/or two-dimensional block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Furthermore, the computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In case of implementing the embodiments herein by software and/or firmware, a program constituting the software may be installed into a computer with dedicated hardware, from a storage medium or a network, and the computer is capable of performing various functions if with various programs installed therein.

Figure 8:
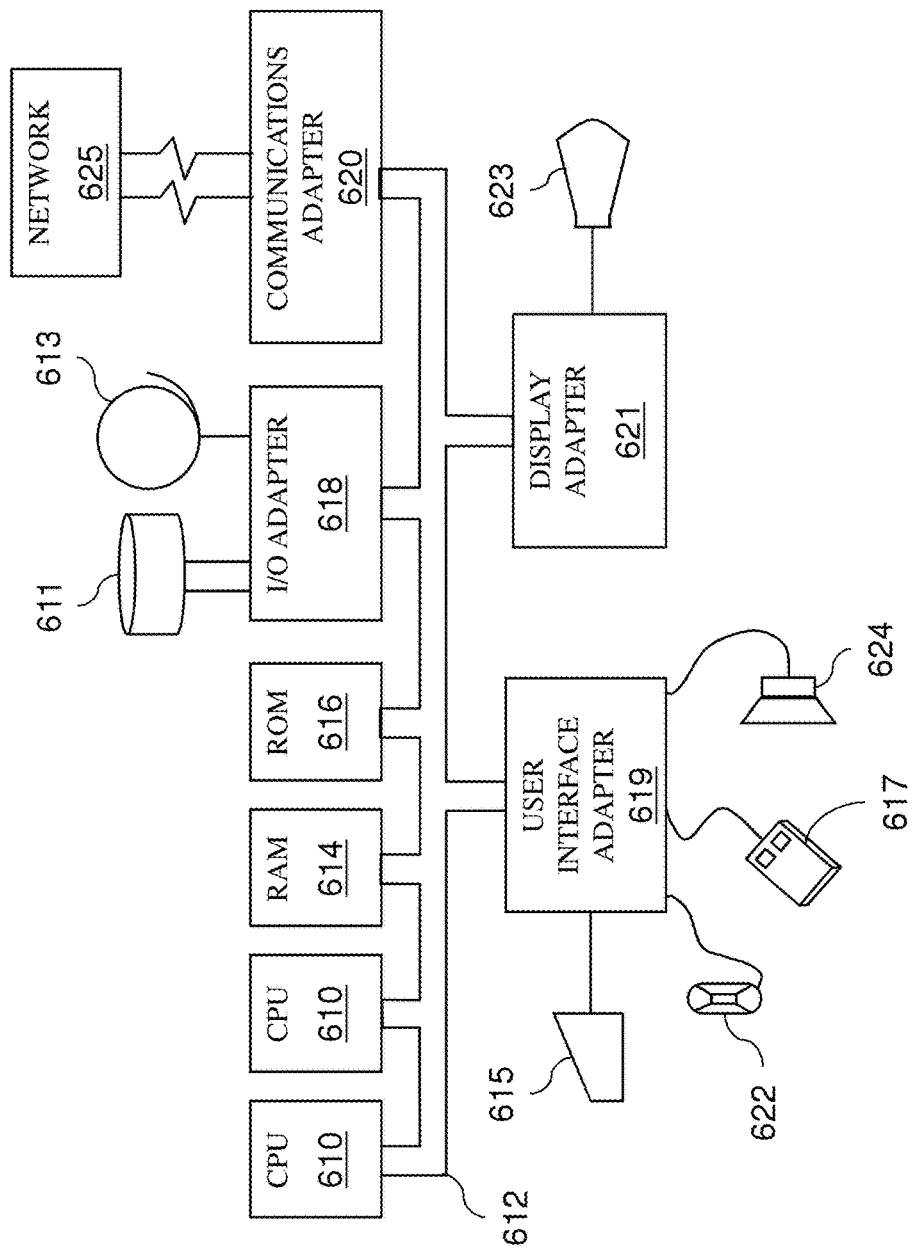
FIG. 8 is a schematic diagram of a hardware system according to embodiments herein.

A representative hardware environment for practicing the embodiments herein is depicted in FIG. 8. This schematic drawing illustrates a hardware configuration of an information handling/computer system in accordance with the embodiments herein. The system comprises at least one processor or central processing unit (CPU) 610. The CPUs 610 are interconnected via system bus 612 to various devices such as a random access memory (RAM) 614, read-only memory (ROM) 616, and an input/output (I/O) adapter 618. The I/O adapter 618 can connect to peripheral devices, such as disk units 611 and tape drives 613, or other program storage devices that are readable by the system. The system can read the inventive instructions on the program storage devices and follow these instructions to execute the methodology of the embodiments herein.

In FIG. 8, CPUs 610 perform various processing based on a program stored in a Read Only Memory (ROM) 616 or a program loaded from a peripheral device, such as disk units 611 and tape drives 613 to a Random Access Memory (RAM) 614. In the RAM 614, required data when the CPU 610 performs the various processing or the like is also stored as necessary. The CPU 610, the ROM 616, and the RAM 614 are connected to one another via a bus 612. An input/output adapter 618 is also connected to the bus 612 to provide an input/output interface, as necessary. A removable medium, such as a magnetic disk, an optical disk, a magneto-optical disk, a semiconductor memory, or the like, is installed on the peripheral device, as necessary, so that a computer program read therefrom may be installed into the RAM 614, as necessary.

The system further includes a user interface adapter 619 that connects a keyboard 615, mouse 617, speaker 624, microphone 622, and/or other user interface devices such as a touch screen device (not shown) to the bus 612 to gather user input. Additionally, a communication adapter 620 including a network interface card such as a LAN card, a modem, or the like connects the bus 612 to a data processing network 625. The communication adapter 620 performs communication processing via a network such as the Internet. A display adapter 621 connects the bus 612 to a display device 623, which may be embodied as an output device such as a monitor (such as a Cathode Ray Tube (CRT), a Liquid Crystal Display (LCD), or the like), printer, or transmitter, for example.

In the case where the above-described series of processing is implemented with software, the program that constitutes the software may be installed from a network such as the Internet or a storage medium such as the removable medium.

Those skilled in the art would appreciate that, the storage medium is not limited to the peripheral device having the program stored therein as illustrated in FIG. 7, which is distributed separately from the device for providing the program to the user. Examples of a removable medium include a magnetic disk (including a floppy disk), an optical disk (including a Compact Disk-Read Only Memory (CD-ROM) and a Digital Versatile Disk (DVD)), a magneto-optical disk (including a Mini-Disk (MD) (registered trademark)), and a semiconductor memory. Alternatively, the storage medium may be the ROM 616, a hard disk contained in the storage section 611, or the like, which has the program stored therein and is distributed to the user together with the device that contains them.

As will be appreciated by one skilled in the art, aspects of the systems and methods herein may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a magnetic storage device 560 (FIG. 7), a portable compact disc read-only memory (CD-ROM) 570, an optical storage device, a "plug-and-play" memory device 580, like a USB flash drive, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods, and computer program products according to various embodiments herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Deployment types include loading directly in the client, server, and proxy computers via loading a storage medium such as a CD, DVD, etc. The process software may also be automatically or semi-automatically deployed into a computer system by sending the process software to a central server or a group of central servers. The process software is then downloaded into the client computers that will execute the process software. The process software is sent directly to the client system via e-mail. The process software is then either detached to a directory or loaded into a directory by a button on the e-mail that executes a program that detaches the process software into a directory. Alternatively, the process software is sent directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then stored on the proxy server.

While it is understood that the process software may be deployed by manually loading directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then stored on the proxy server.

Figure 9:
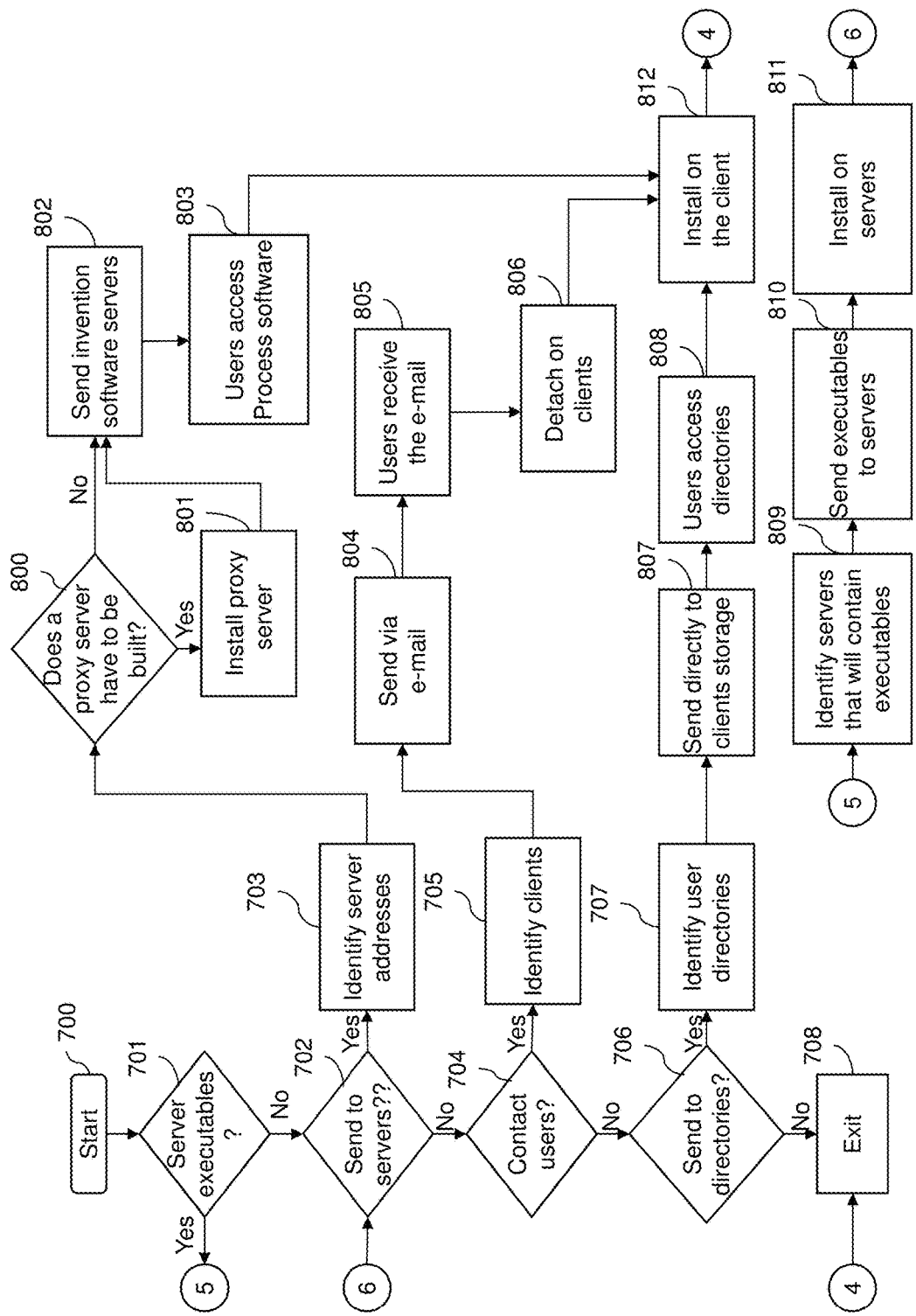
FIG. 9 is a schematic diagram of a deployment system according to embodiments herein.

In FIG. 9, step 700 begins the deployment of the process software. The first thing is to determine if there are any programs that will reside on a server or servers when the process software is executed 701. If this is the case, then the servers that will contain the executables are identified 809. The process software for the server or servers is transferred directly to the servers' storage via FTP or some other protocol, or by copying through the use of a shared file system 810. The process software is then installed on the servers 811.

Next, a determination is made on whether the process software is to be deployed by having users access the process software on a server or servers 702. If the users are to access the process software on servers, then the server addresses that will store the process software are identified 703.

A determination is made if a proxy server is to be built 800 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed 801. The process software is sent to the servers either via a protocol such as FTP or it is copied directly from the source files to the server files via file sharing 802. Another embodiment would be to send a transaction to the servers that contain the process software and have the server process the transaction, then receive and copy the process software to the server's file system. Once the process software is stored at the servers, the users, via their client computers, then access the process software on the servers and copy to their client computers file systems 803. Another embodiment is to have the servers automatically copy the process software to each client and then run the installation program for the process software at each client computer. The users execute the program that installs the process software on their client computer 812, and then exit the process 708.

In step 704, a determination is made whether the process software is to be deployed by sending the process software to users via e-mail. The set of users where the process software will be deployed are identified together with the addresses of the user client computers 705. The process software is sent via e-mail 804 to each of the users' client computers. The users receive the e-mail 805 and then detach the process software from the e-mail to a directory on their client computers 806. The users execute the program that installs the process software on their client computer 812, and then exit the process 708.

Lastly, a determination is made on whether to the process software will be sent directly to user directories on their client computers 706. If so, the user directories are identified 707. The process software is transferred directly to the users' client computer directory 807. This can be done in several ways such as but not limited to sharing of the file system directories and then copying from the sender's file system to the recipient users' file system or alternatively using a transfer protocol such as File Transfer Protocol (FTP). The users access the directories on their client file systems in preparation for installing the process software 808. The users execute the program that installs the process software on their client computer 812, and then exit the process 708.

The process software is integrated into a client, server, and network environment by providing for the process software to coexist with applications, operating systems, and network operating systems software, and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely, parameters passed by the software applications to the process software will be checked to ensure the parameters match the parameters required by the process software. The client and server operating systems including the network operating systems will be identified and compared to the list of operating systems, version numbers, and network software that have been tested to work with the process software. Those operating systems, version numbers, and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 10:
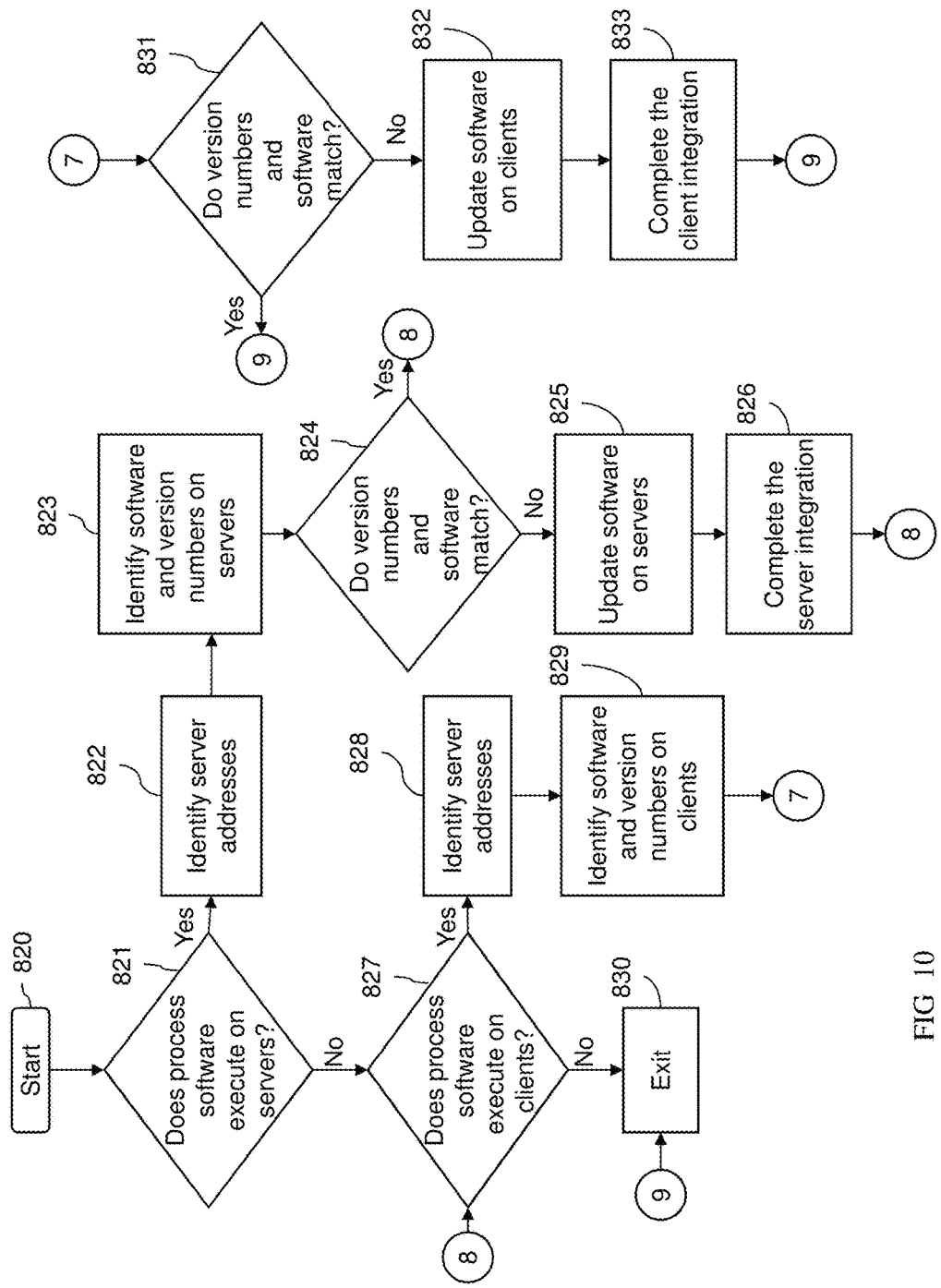
FIG. 10 is a schematic diagram of an integration system according to embodiments herein.

In FIG. 10, step 820 begins the integration of the process software. The first thing is to determine if there are any process software programs that will execute on a server or servers 821. If this is not the case, then integration proceeds to 827. If this is the case, then the server addresses are identified 822. The servers are checked to see if they contain software that includes the operating system (OS), applications, and network operating systems (NOS), together with their version numbers, that have been tested with the process software 823. The servers are also checked to determine if there is any missing software that is required by the process software 823.

A determination is made if the version numbers match the version numbers of OS, applications, and NOS that have been tested with the process software 824. If all of the versions match and there is no missing required software, the integration continues in 827.

If one or more of the version numbers do not match, then the unmatched versions are updated on the server or servers with the correct versions 825. Additionally, if there is missing required software, then it is updated on the server or servers 825. The server integration is completed by installing the process software 826.

Step 827, which follows either step 821, 824, or 826, determines if there are any programs of the process software that will execute on the clients. If no process software programs execute on the clients, the integration proceeds to 830 and exits. If this not the case, then the client addresses are identified 828.

The clients are checked to see if they contain software that includes the operating system (OS), applications, and network operating systems (NOS), together with their version numbers, that have been tested with the process software 829. The clients are also checked to determine if there is any missing software that is required by the process software 829.

A determination is made as to whether the version numbers match the version numbers of OS, applications, and NOS that have been tested with the process software 831. If all of the versions match and there is no missing required software, then the integration proceeds to 830 and exits.

If one or more of the version numbers do not match, then the unmatched versions are updated on the clients with the correct versions 832. In addition, if there is missing required software then it is updated on the clients 832. The client integration is completed by installing the process software on the clients 833. The integration proceeds to 830 and exits.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally, the assessed server may make requests of other servers that require CPU units. CPU units are an example that represents one measurement of use. Other measurements of use include but are not limited to network bandwidth, memory usage, storage usage, packet transfers, complete transactions etc. When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added to share the workload. The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer, which then remits payment to the service provider. In another embodiment, the service provider requests payment directly from a customer account at a banking or financial institution. In another embodiment, if the service provider is also a customer of the customer that uses the process software application, the payment owed to the service provider is reconciled to the payment owed by the service provider to minimize the transfer of payments.

The process software is shared, simultaneously serving multiple customers in a flexible, automated fashion. It is standardized, requiring little customization, and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally, the assessed server may make requests of other servers that require CPU units. CPU units are an example that represents one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer, which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 11:
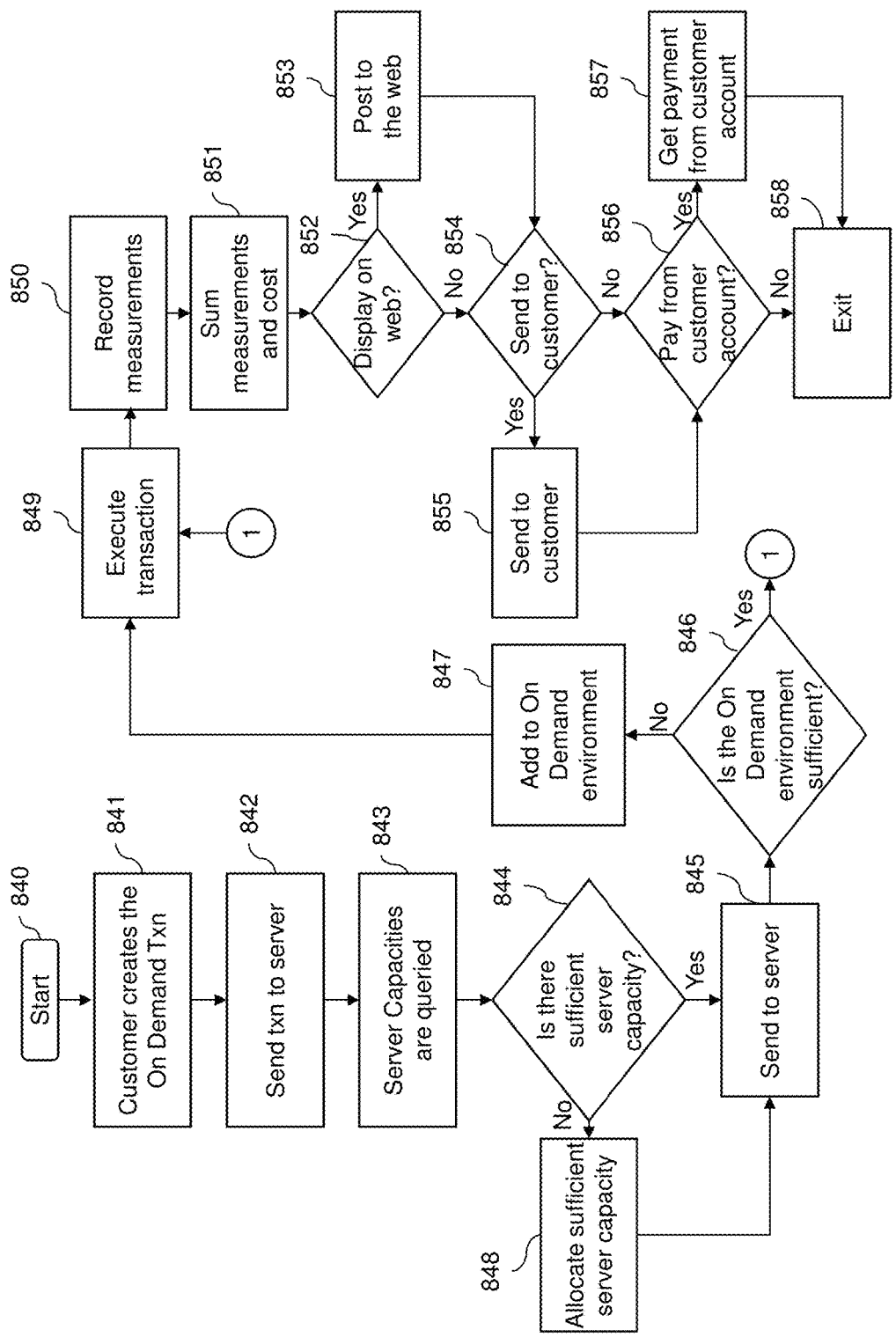
FIG. 11 is a schematic diagram of an on demand system according to embodiments herein.

In FIG. 11, step 840 begins the On Demand process. A transaction is created that contains the unique customer identification, the requested service type, and any service parameters that further specify the type of service 841. The transaction is then sent to the main server 842. In an On Demand environment, the main server can initially be the only server, then, as capacity is consumed, other servers are added to the On Demand environment.

The server central processing unit (CPU) capacities in the On Demand environment are queried 843. The CPU requirement of the transaction is estimated, then the servers' available CPU capacity in the On Demand environment are compared to the transaction CPU requirement to see if there is sufficient CPU capacity available in any server to process the transaction 844. If there is not sufficient server CPU capacity available, then additional server CPU capacity is allocated to process the transaction 848. If there was already sufficient CPU capacity available, then the transaction is sent to a selected server 845.

Before executing the transaction, a check is made of the remaining On Demand environment to determine if the environment has sufficient available capacity for processing the transaction. This environment capacity consists of such things as, but not limited to, network bandwidth, processor memory, storage etc. 846. If there is not sufficient available capacity, then capacity will be added to the On Demand environment 847. Next, the required software to process the transaction is accessed, loaded into memory, then the transaction is executed 849.

The usage measurements are recorded 850. The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs, and then recorded as a charge to the requesting customer 851. If the customer has requested that the On Demand costs be posted to a web site 852, then they are posted 853.

If the customer has requested that the On Demand costs be sent via e-mail to a customer address 854, then they are sent 855. If the customer has requested that the On Demand costs be paid directly from a customer account 856, then payment is received directly from the customer account 857. The last step is to exit the On Demand process 858.

The process software may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee.

The process software may be deployed, accessed, and executed through either a remote-access or a site-to-site VPN. When using the remote-access VPNs, the process software is deployed, accessed, and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download, and execute the process software.

When using the site-to-site VPN, the process software is deployed, accessed, and executed through the use of dedicated equipment and large-scale encryption, which are used to connect a company's multiple fixed sites over a public network, such as the Internet.

The process software is transported over the VPN via tunneling, which is the process of placing an entire packet within another packet and sending it over a network. The protocol of the outer packet is understood by the network and both points, called tunnel interfaces, where the packet enters and exits the network.

Figure 12:
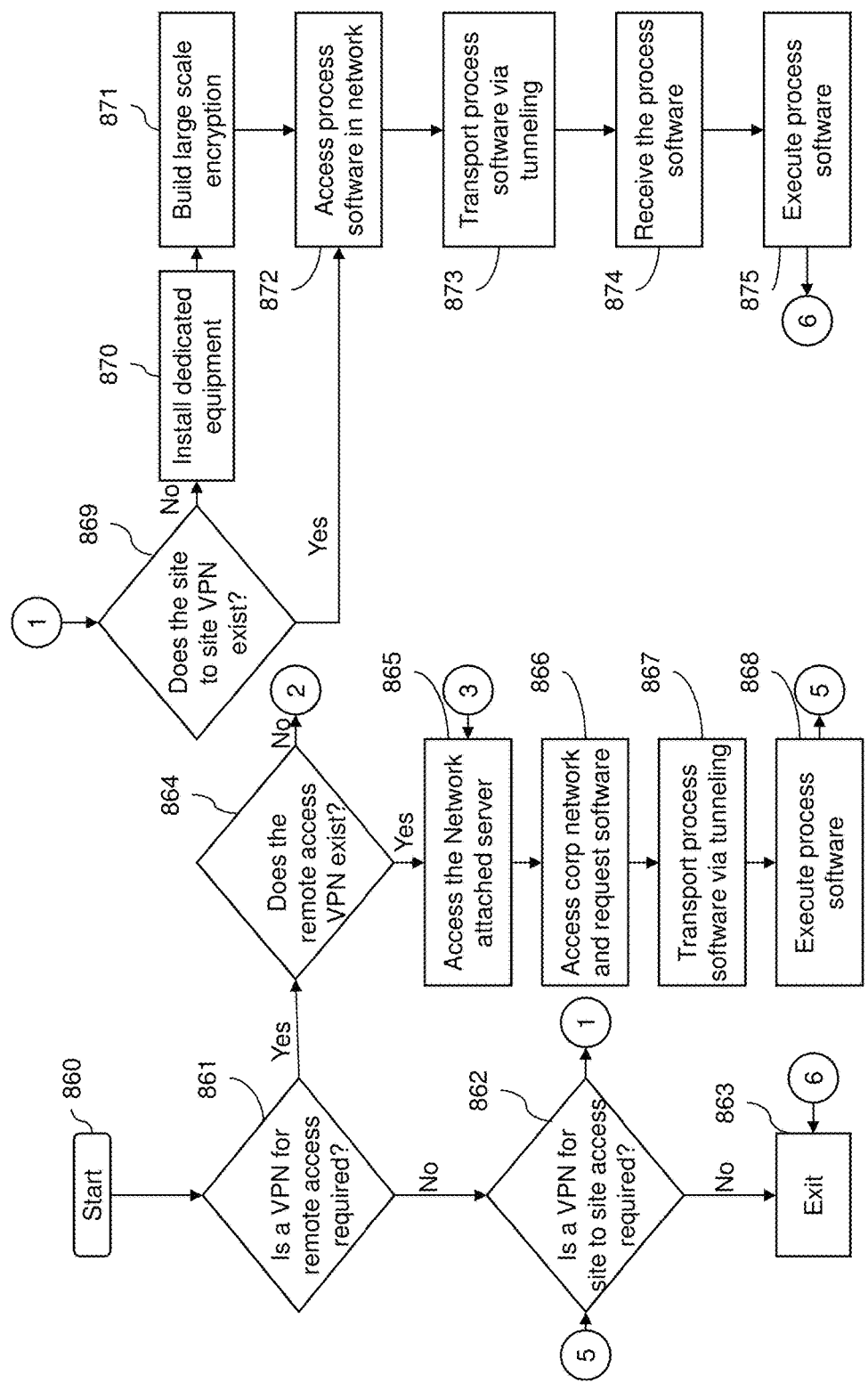
FIG. 12 is a schematic diagram of a virtual private network system according to embodiments herein.

In FIGS. 12 and 13, step 860 begins the Virtual Private Network (VPN) process. A determination is made to see if a VPN for remote access is required 861. If it is not required, then proceed to 862. If it is required, then determine if the remote access VPN exists 864.

If it does exist, then proceed to 865. Otherwise, identify the third party provider that will provide the secure, encrypted connections between the company's private network and the company's remote users 876. The company's remote users are identified 877. The third party provider then sets up a network access server (NAS) 878 that allows the remote users to dial a toll-free number or attach directly via a cable or DSL modem to access, download, and install the desktop client software for the remote-access VPN 879.

After the remote access VPN has been built, or if it been previously installed, the remote users can then access the process software by dialing into the NAS or attaching directly via a cable or DSL modem into the NAS 865. This allows entry into the corporate network where the process software is accessed 866. The process software is transported to the remote users' desktop over the network via tunneling. That is, the process software is divided into packets and each packet, including the data and protocol, is placed within another packet 867. When the process software arrives at the remote users' desktop, it is removed from the packets, reconstituted, and executed on the remote users' desktop 868.

A determination is made to see if a VPN for site-to-site access is required 862. If it is not required, then proceed to exit the process 863. Otherwise, determine if the site-to-site VPN exists 869. If it does exist, then proceed to 872. Otherwise, install the dedicated equipment required to establish a site-to-site VPN 870. Then build the large-scale encryption into the VPN 871.

After the site-to-site VPN has been built, or if it had been previously established, the users access the process software via the VPN 872. The process software is transported to the site users over the network via tunneling 873. That is, the process software is divided into packets and each packet, including the data and protocol, is placed within another packet 874. When the process software arrives at the remote users' desktop, it is removed from the packets, reconstituted, and executed on the site users' desktop 875. Proceed to exit the process 863.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computerized device, comprising:
a question-answer system comprising a processor running software for performing a plurality of question answering processes and a corpus of data;
a receiver receiving a first question into the question-answer system; and
a network interface connected to external sources comprising a community of human respondents;
said processor:
comparing the first question to the corpus of data;
generating candidate answers for the first question posed to the question-answer system, the candidate answers for the first question being generated from the corpus of data;
determining a confidence score for each of the candidate answers based on evidence from the corpus of data used to generate the candidate answers, the determining a confidence score further comprises assigning an evidence score to the evidence based on how well the evidence matches the first question, wherein the evidence comprises good evidence, marginal evidence, and bad evidence;
identifying information to supplement the marginal evidence, the information improves the confidence scores for the candidate answers to the first question;
generating a plurality of hypotheses concerning the information that supplements the marginal evidence and improves the confidence scores for the candidate answers to the first question;
generating the at least one secondary question based on each hypothesis of the plurality of hypotheses concerning the information that supplements the marginal evidence and improves the confidence scores for the candidate answers to the first question, an answer to the at least one secondary question improving the ability of the question-answer system to understand and evaluate evidence associated with the candidate answers to the first question;
ranking the hypotheses based on relative utility to determine an order in which to output the at least one secondary question to the external sources;
outputting the at least one secondary question to the external sources using the network interface;
receiving responses to the at least one secondary question from the external sources using the network interface;
validating the responses to the at least one secondary question to extract a piece of data, fact, syntactical relationship, grammatical relationship, logical rule, or taxonomy rule that improves the confidence scores for the candidate answers to the first question, the validating comprises validating that the responses are supported by a threshold number of external sources; and
adding the piece of data, fact, syntactical relationship, grammatical relationship, logical rule, or taxonomy rule extracted from responses to the at least one secondary question to the corpus of data.

2. The computerized device of claim 1, the processor generating a plurality of hypotheses further comprising:
analyzing elements of the first question;
for each of the candidate answers, forming a hypothesis based on considering each candidate answer in context of the first question;
spawning an independent thread for each hypothesis that attempts to prove the candidate answer;
extracting evidence related to each hypothesis from the corpus of data; and
for each evidence-hypothesis pair, analyzing elements of the first question and the evidence.

3. The computerized device of claim 2, the analyzing elements of the first question and the evidence being along dimensions selected from the group consisting of:
type classification,
time,
geography,
popularity,
passage support,
source reliability, and
semantic relatedness.

4. The computerized device of claim 1, wherein factors affecting the ranking the hypotheses further comprise at least one of:
cumulative impact on all candidate answers based on the responses to one or more secondary questions,
estimated impact on future questions in the corpus of data based on determining a likelihood that a hypothesis will appear in relevant content for future questions,
frequency of observation of terms in the question in the corpus of data, and
likelihood that an intuitive and answerable secondary question may be formulated for a human expert.

5. The computerized device of claim 1, processor generating at least one secondary question comprising forming a natural-language inquiry; and
the processor generating at least one secondary question comprising at least one of:
using the question and the evidence to formulate the at least one secondary question,
using semantic concepts to formulate the at least one secondary question,
using relations and data to formulate the at least one secondary question, and
using background knowledge to formulate the at least one secondary question.

6. The computerized device of claim 1, the processor generating at least one secondary question selected from the group consisting of:
simple Yes/No questions;
questions requiring responses on a qualitative scale; and
questions requiring a quantitative response.

7. A computer system, comprising:
an automated question answering (QA) system comprising:
a corpus of data;
a processor operatively connected to the corpus of data, the processor having software for performing a plurality of question answering processes;
a receiver operatively connected to the processor; and
a network interface operatively connected to the processor and to external expert community sources;
the receiver receiving a question into the automated QA system,
the processor comparing the question to the corpus of data and generating a plurality of candidate answers to the question from the corpus of data, the processor determining a confidence score for each candidate answer of the plurality of candidate answers based on evidence used to generate the each candidate answer of the plurality of candidate answers, wherein the evidence comprises good evidence, marginal evidence, and bad evidence, the processor identifying information to supplement the marginal evidence, the information improves the confidence scores for at least one candidate answer in the plurality of candidate answers, the processor generating a plurality of hypotheses concerning the information that supplements the marginal evidence and improves the confidence scores for the at least one candidate answer, the processor generating the at least one follow-on inquiry based on each hypothesis of the plurality of hypotheses, the processor ranking the hypotheses based on relative utility, the ranking determining an order for the automated QA system to output the at least one follow-on inquiry to the external expert community sources, the processor outputting the at least one follow-on inquiry to the external expert community sources using the network interface, the processor receiving responses to the at least one follow-on inquiry from the external expert community sources using the network interface, the processor validating the responses to the at least one follow-on inquiry and extracting a piece of data, fact, syntactical relationship, grammatical relationship, logical rule, or taxonomy rule that improves the confidence scores for the at least one candidate answer, the validating comprises validating that the responses are supported by a threshold number of external expert community sources, and the processor adding the piece of data, fact, syntactical relationship, grammatical relationship, logical rule, or taxonomy rule extracted from the responses to the at least one follow-on inquiry to the corpus of data.

8. The computer system of claim 7, wherein factors affecting the ranking the hypotheses further comprise at least one of:
cumulative impact on all candidate answers based on responses to one or more follow-on inquiries,
estimated impact on future questions in the corpus of data based on determining a likelihood that a hypothesis will appear in relevant content for future questions,
frequency of observation of terms in the question in the corpus of data, and
likelihood that an intuitive and answerable follow-on inquiry may be formulated for a human expert.

9. The computer system of claim 7, the processor generating a plurality of hypotheses further comprising:
analyzing the question;
for each candidate answer of the plurality of candidate answers, forming a hypothesis based on considering each the candidate answer in context of the question;
spawning an independent thread for each hypothesis that attempts to prove the candidate answer;
extracting evidence related to each hypothesis from the corpus of data; and
for each evidence-hypothesis pair, analyzing elements of the question and the evidence.

10. The computer system of claim 9, the analyzing the elements of the question and the extracting the evidence being along dimensions selected from the group consisting of:

type classification,
time,
geography,
popularity,
passage support,
source reliability, and semantic relatedness.

11. The computer system of claim 7, the processor generating at least one follow-on inquiry comprising forming a natural language inquiry, and
the processor generating at least one follow-on inquiry comprising at least one of:
using the question and evidence to generate the at least one follow-on inquiry,
using semantic concepts to generate the at least one follow-on inquiry,
using relations and data to generate the at least one follow-on inquiry, and
using background knowledge to generate the at least one follow-on inquiry.

12. The computer system of claim 7, the at least one follow-on inquiry being selected from the group consisting of:
simple Yes/No questions;
questions requiring responses on a qualitative scale; and
questions requiring a quantitative response.

13. A question answering (QA) system comprising:
a processor;
an evidence analysis module, the evidence analysis module being operatively connected to the processor;
a first interface operatively connected to the processor;
a second interface operatively connected to the processor and to one or more external sources separate from the QA system, the one or more external sources comprising a community of human respondents; and
a corpus of data operatively connected to the evidence analysis module,
the first interface receiving a first question to be answered by the QA system,
the processor comparing the first question to the corpus of data and creating a collection of candidate answers to the first question from the corpus of data, each candidate answer in the collection of candidate answers to the first question having supporting evidence and a confidence score generated by the processor based on the evidence from corpus of data used to generate the candidate answer, wherein the evidence comprises good evidence, marginal evidence, and bad evidence;
the evidence analysis module identifying information to supplement the marginal evidence, the information that improves the confidence scores for the candidate answers to the first question,
the processor generating a plurality of hypotheses concerning the information to supplement the marginal evidence, the information that improves the confidence scores for the candidate answers to the first question,
the evidence analysis module producing the secondary question based on each hypothesis of the plurality of hypotheses, an answer to the secondary question improving the ability of the QA system to understand and evaluate evidence associated with candidate answers to the first question,
the processor ranking the hypotheses based on relative utility, the ranking determining an order in which the QA system outputs a secondary question to the one or more external sources, the processor presenting the secondary question through the second interface to the one or more external sources separate from the QA system to obtain responses to the secondary question, the processor receiving at least one response to the secondary question from the one or more external sources through the second interface, the evidence analysis module validating the at least one response to the secondary question and extracting a piece of data, fact, syntactical relationship, grammatical relationship, logical rule, or taxonomy rule that improves the confidence scores for the candidate answer to the first question, the validating comprises validating that the responses are supported by a threshold number of external sources, the processor adding the piece of data, fact, syntactical relationship, grammatical relationship, logical rule, or taxonomy rule extracted from the at least one response to the corpus of data.

14. The question answering system of claim 13, the processor generating a plurality of hypotheses concerning the information that improves the confidence scores for the candidate answers further comprising:

analyzing the first question;

for each candidate answer or the collection of candidate answers, forming a hypothesis based on considering the each candidate answer in context of the first question;

spawning an independent thread for each hypothesis that attempts to prove the candidate answer;

extracting evidence related to each hypothesis from the corpus of data; and for each evidence-hypothesis pair, analyzing elements of the first question and the evidence along dimensions selected from the group consisting of:
type classification,
time,
geography,
popularity,
passage support,
source reliability, and semantic relatedness.

15. The question answering system of claim 13, factors affecting the ranking the ranking of the hypotheses further comprising at least one of:

cumulative impact on all candidate answers based on responses to one or more secondary questions, estimated impact on future questions in the corpus of data based on determining a likelihood that a hypothesis will appear in relevant content for further questions, frequency of observations of terms in the first question in background knowledge base, and likelihood that an intuitive and answerable question may be formulated for a human expert.

16. The question answering system of claim 13, the evidence analysis module producing a secondary question based on the hypotheses comprising forming a natural-language inquiry; and the evidence analysis module producing a secondary question comprising at least one of:
using question and evidence to generate the secondary question,
using semantic concepts to generate the secondary question,
using relations and data to generate the secondary question, and
using background knowledge to generate the secondary question.

17. The question answering system of claim 13, the secondary question being selected from the group consisting of:
simple Yes/No questions;
questions requiring responses on a qualitative scale; and
questions requiring a quantitative response.

18. A non-transitory computer readable storage medium readable by a computerized device, the computerized device comprising a question-answer system, the non-transitory computer readable storage medium storing instructions executable by the computerized device to perform a method comprising:

receiving a first question into the question-answer system;

comparing the question to the corpus of data;

generating candidate answers for the first question from the corpus of data;

determining a confidence score for each of the candidate answers based on evidence from the corpus of data used to generate the candidate answers, wherein the evidence comprises good evidence, marginal evidence, and bad evidence;

identifying information from the corpus of data to supplement the marginal evidence, the information that improves confidence scores for candidate answers to a first question posed to the question-answer system;

automatically generating a plurality of hypotheses concerning the information that supplements the marginal evidence and improves the confidence scores for the candidate answers to the first question posed to the question-answer system, the automatically generating the plurality of hypotheses further comprising:

analyzing the first question, for each candidate answer of the candidate answers, forming a hypothesis based on considering each the candidate answer in context of the first question, spawning an independent thread for each hypothesis that attempts to prove the candidate answer, extracting evidence related to each hypothesis from the corpus of data, and for each evidence-hypothesis pair, analyzing elements of the first question and the evidence along dimensions selected form the group consisting of:
type classification,
time,
geography,
popularity,
passage support,
source reliability, and semantic relatedness;

automatically generating at least one secondary question based on each of the plurality of hypotheses, an answer to the at least one secondary question improving the ability of the question-answer system to understand and evaluate evidence associated with the candidate answers to the first question;

ranking the hypotheses based on relative utility, the ranking determining an order in which to output the at least one secondary question to external sources comprising a community of human respondents, wherein the community of human respondents are capable of answering the at least one secondary question;

outputting the at least one secondary question to the external sources using a network interface;

receiving responses to the at least one secondary question from the external sources using the network interface;

validating the responses to the at least one secondary question to extract a piece of data, fact, syntactical relationship, grammatical relationship, logical rule, or taxonomy rule that improves confidence scores for the candidate answers to the first question, the validating comprises validating that the responses are supported by a threshold number of external sources; and adding the piece of data, fact, syntactical relationship, grammatical relationship, logical rule, or taxonomy rule extracted from responses to the at least one secondary question to the corpus of data.

19. The non-transitory computer readable storage medium of claim 18, factors affecting the ranking the hypotheses further comprising at least one of:

cumulative impact on all candidate answers based on responses to one or more follow-on inquiries, estimated impact on future questions in the corpus of data based on determining a likelihood that a hypothesis will appear in relevant content for future questions, frequency of observation of terms in the question in the corpus of data, and likelihood that an intuitive and answerable secondary question may be formulated for a human expert.

20. The non-transitory computer readable storage medium of claim 18, the generating at least one secondary question comprising formulating a natural language inquiry, and the generating at least one secondary question comprising at least one of:

using the first question and evidence related to at least one hypothesis to formulate the at least one secondary question, using semantic concepts to generate the at least one secondary question, using relations and data to generate the at least one secondary question, and using background knowledge to generate the at least one secondary question.

21. The non-transitory computer readable storage medium of claim 18, the at least one secondary question selected from the group consisting of:

simple Yes/No questions;

questions requiring responses on a qualitative scale; and questions requiring a quantitative response.

\* \* \* \* \*